US012503331B2

(12) United States Patent
Seto et al.

(10) Patent No.: US 12,503,331 B2
(45) Date of Patent: Dec. 23, 2025

(54) MEDIUM PROCESSING APPARATUS AND IMAGE FORMING SYSTEM INCORPORATING SAME

(71) Applicants: Kazuki Seto, Kanagawa (JP); Kei Sasaki, Kanagawa (JP); Keisuke Sugiyama, Kanagawa (JP)

(72) Inventors: Kazuki Seto, Kanagawa (JP); Kei Sasaki, Kanagawa (JP); Keisuke Sugiyama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/691,599

(22) PCT Filed: Oct. 13, 2022

(86) PCT No.: PCT/IB2022/059801
§ 371 (c)(1),
(2) Date: Mar. 13, 2024

(87) PCT Pub. No.: WO2023/073474
PCT Pub. Date: May 4, 2023

(65) Prior Publication Data

US 2024/0391726 A1 Nov. 28, 2024

(30) Foreign Application Priority Data

Oct. 29, 2021 (JP) ................................ 2021-178096
Sep. 7, 2022 (JP) ................................ 2022-142320

(51) Int. Cl.
*B65H 37/04* (2006.01)
*B31F 5/02* (2006.01)
(Continued)

(52) U.S. Cl.
CPC ............... *B65H 37/04* (2013.01); *B31F 5/02* (2013.01); *B41J 3/44* (2013.01); *G03G 15/6541* (2013.01);
(Continued)

(58) Field of Classification Search
CPC ......... H04N 1/00639; B31F 1/36; B31F 5/02; B31F 2201/0702; B31F 2201/0771;
(Continued)

(56) References Cited

U.S. PATENT DOCUMENTS 7,922,163 B2 * 4/2011 Ichihashi ............... B65H 31/34 270/58.11
9,764,582 B2 * 9/2017 Taguchi ................. B65H 45/18
(Continued)

FOREIGN PATENT DOCUMENTS

JP 2014148398 A 8/2014
JP 2015101009 A 6/2015
(Continued)

OTHER PUBLICATIONS

Espacenet machine translation of JP2017-013930A; https://translationportal.epo.org/emtp/translate/?ACTION=description-retrieval&COUNTRY=JP&ENGINE=google&FORMAT=docdb&KIND=A&LOCALE=en_EP&NUMBER=2017013930&OPS=ops.epo.org/3.2&SRCLANG=ja&TRGLANG=en (Year: 2017).*
(Continued)

*Primary Examiner* — Leslie A Nicholson, III
(74) *Attorney, Agent, or Firm* — Harness, Dickey & Pierce, P.L.C.

(57) ABSTRACT

A medium processing apparatus includes a conveying unit, a liquid applier, and a crimper. The conveying unit conveys a medium in a conveyance direction. The liquid applier applies liquid to the medium conveyed by the conveying unit. The liquid applier includes a presser and a liquid
(Continued)

application member. The presser presses the medium. The liquid application member contacts and is separated from the medium while the presser presses the medium. The crimper presses and deforms a plurality of media including the medium to which the liquid is applied by the liquid applier, to crimp and bind the plurality of media.

19 Claims, 21 Drawing Sheets

(51) Int. Cl.
*B41J 3/44* (2006.01)
*G03G 15/00* (2006.01)
*B42C 1/12* (2006.01)

(52) U.S. Cl.
CPC ...... *B42C 1/12* (2013.01); *B65H 2301/51616* (2013.01); *B65H 2301/5162* (2013.01); *B65H 2557/64* (2013.01); *B65H 2801/27* (2013.01)

(58) Field of Classification Search
CPC ........ B31F 2201/0784; G03G 15/6541; G03G 15/6544; B65H 37/04; B65H 2301/51616; B65H 2301/5142; B65H 2701/27; B42C 1/12
USPC ............................................ 270/58.07, 58.08
See application file for complete search history.

(56) References Cited

U.S. PATENT DOCUMENTS

| | | | | |
|---|---|---|---|---|
| 10,723,580 | B2 * | 7/2020 | Nobe | B42B 5/00 |
| 11,800,030 | B2 * | 10/2023 | Seto | H04N 1/00631 |
| 11,981,529 | B2 * | 5/2024 | Tsuruoka | G03G 15/6538 |
| 11,987,468 | B2 * | 5/2024 | Suzuki | B65H 35/04 |
| 12,043,508 | B2 * | 7/2024 | Oikawa | B31F 1/36 |
| 12,162,242 | B2 * | 12/2024 | Fukuchi | B42B 5/00 |
| 12,172,861 | B2 * | 12/2024 | Abe | B65H 43/00 |
| 2014/0219747 | A1 | 8/2014 | Takahashi et al. | |
| 2020/0307945 | A1 | 10/2020 | Mori et al. | |
| 2020/0317462 | A1 | 10/2020 | Kawakami | |
| 2022/0334525 | A1 | 10/2022 | Sasaki et al. | |

FOREIGN PATENT DOCUMENTS

| | | | |
|---|---|---|---|
| JP | 2017013930 | A | 1/2017 |
| JP | 6395024 | B2 | 9/2018 |
| JP | 2018199244 | A | 12/2018 |

OTHER PUBLICATIONS

International Search Report and Written Opinion issued on Jan. 25, 2023 in PCT/IB2022/059801 filed on Oct. 13, 2022.

* cited by examiner

MEDIUM PROCESSING APPARATUS AND IMAGE FORMING SYSTEM INCORPORATING SAME

TECHNICAL FIELD

Embodiments of the present disclosure relate to a medium processing apparatus and an image forming system incorporating the medium processing apparatus.

BACKGROUND ART

Medium processing apparatuses are known in the related art that bind, into a bundle, sheet-like media on which images are formed by image forming apparatuses. Since sheets of paper are widely known as an example of the sheet-like media, a "sheet bundle" that is a stack of sheets of paper is used as an example of a bundle of sheet-like media in the following description. Some medium processing apparatuses include a crimper or crimping unit that can perform so-called "crimp binding" without using metal binding needles (staples) from a viewpoint of resource saving and reduction in environmental load. Specifically, the crimper or crimping unit sandwiches a sheet bundle with serrate binding teeth to press and deform the sheet bundle.

An increased number of sheets of the sheet bundle hamper the binding teeth in biting into the sheet bundle and may cause some sheets to peel off from the bound sheets. Thus, the crimp binding has some difficulties in keeping the sheet bundle bound as appropriate. In order to increase the binding strength, some medium processing apparatuses that execute the crimp binding include a liquid applier or liquid application unit that applies liquid in advance to a position on a sheet where the binding teeth contact the sheet, to allow the binding teeth to easily bite into a sheet bundle (for example, see Patent Literature (PTL) 1). In the following description, the position where the binding teeth contact a sheet may be referred to as a "binding position."

CITATION LIST

Patent Literature

[PTL 1]
Japanese Unexamined Patent Application Publication No. 2015-101009

SUMMARY OF INVENTION

Technical Problem

The sheets to be bound by the medium processing apparatus may be wavy or curved due to an influence of the previous processing when the sheets are supplied to a position where the sheets are bound. In this case, the shape at the binding position of the sheets of the sheet bundle is disturbed. Such a disturbing shape of the sheets may cause the sheet bundle to float from a tray when the liquid is applied to the sheet bundle, rendering an unstable amount of liquid being applied to the sheet bundle.

In light of the above-described problems, it is an object of the present invention to provide a technique of applying a stable amount of liquid to media for a medium processing apparatus that performs the crimp binding after applying the liquid to the media.

Solution to Problem

A medium processing apparatus includes a conveying unit, a liquid applier, and a crimper. The conveying unit conveys a medium in a conveyance direction. The liquid applier applies liquid to the medium conveyed by the conveying unit. The liquid applier includes a presser and a liquid application member. The presser presses the medium. The liquid application member contacts and is separated from the medium while the presser presses the medium. The crimper presses and deforms a plurality of media including the medium to which the liquid is applied by the liquid applier, to crimp and bind the plurality of media.

An image forming system includes an image forming apparatus and the medium processing apparatus described above. The image forming apparatus forms an image on a medium. The medium processing apparatus crimps and binds the plurality of media on each of which the image is formed by the image forming apparatus.

Advantageous Effects of Invention

According to one aspect of the present disclosure, a medium processing apparatus that performs the crimp binding after applying liquid to media applies a stable amount of liquid to the media.

BRIEF DESCRIPTION OF DRAWINGS

A more complete appreciation of embodiments of the present disclosure and many of the attendant advantages and features thereof can be readily obtained and understood from the following detailed description with reference to the accompanying drawings.

Figure 1:
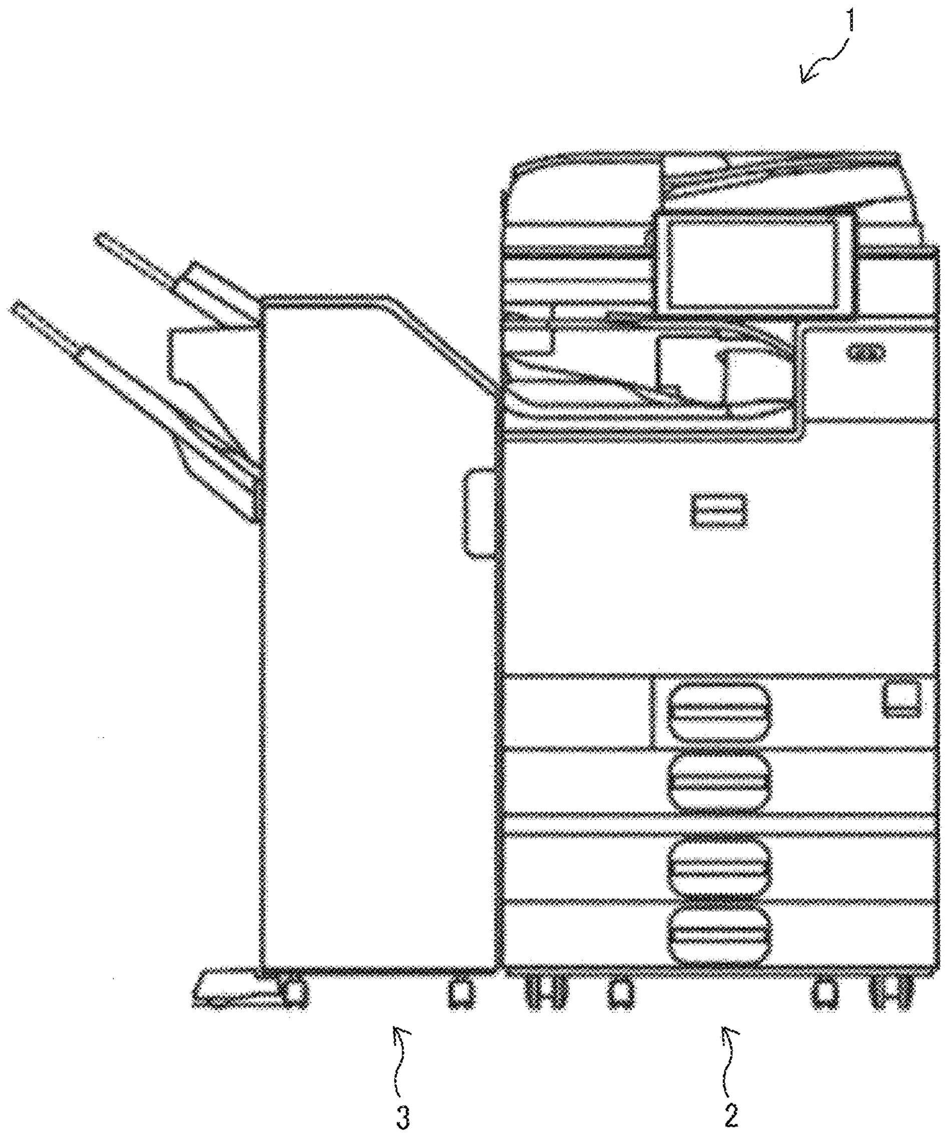
FIG. 1 is a diagram illustrating the overall configuration of an image forming system according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise. For the sake of simplicity, like reference numerals are given to identical or corresponding constituent elements such as parts and materials having the same functions, and redundant descriptions thereof are omitted unless otherwise required. As used herein, the term "connected/coupled" includes both direct connections and connections in which there are one or more intermediate connecting elements.

Initially, a description is given of a first embodiment of the present disclosure. With reference to the drawings, a description is now given of a printer system 1 serving as an image forming system according to an embodiment of the present disclosure. FIG. 1 is a diagram illustrating the overall configuration of the printer system 1. The printer system 1 has a function of forming an image on a sheet P (medium) and performing post-processing on the sheet P on which the image is formed. As illustrated in FIG. 1, the printer system 1 includes an image forming apparatus 2 and a post-processing apparatus 3 serving as a medium processing apparatus according to the present embodiment.

The image forming apparatus 2 forms an image on the sheet P and outputs the sheet P bearing the image to the post-processing apparatus 3. The image forming apparatus 2 includes a tray that accommodates the sheet P, a conveying unit that conveys the sheet P accommodated in the tray, and an image forming unit that forms an image on the sheet P conveyed by the conveying unit. The image forming unit may be an inkjet image forming unit that forms an image with ink or an electrophotographic image forming unit that forms an image with toner. Since the image forming apparatus 2 has a typical configuration, a detailed description of the configuration and functions of the image forming apparatus 2 are omitted unless otherwise required.

Figure 2:
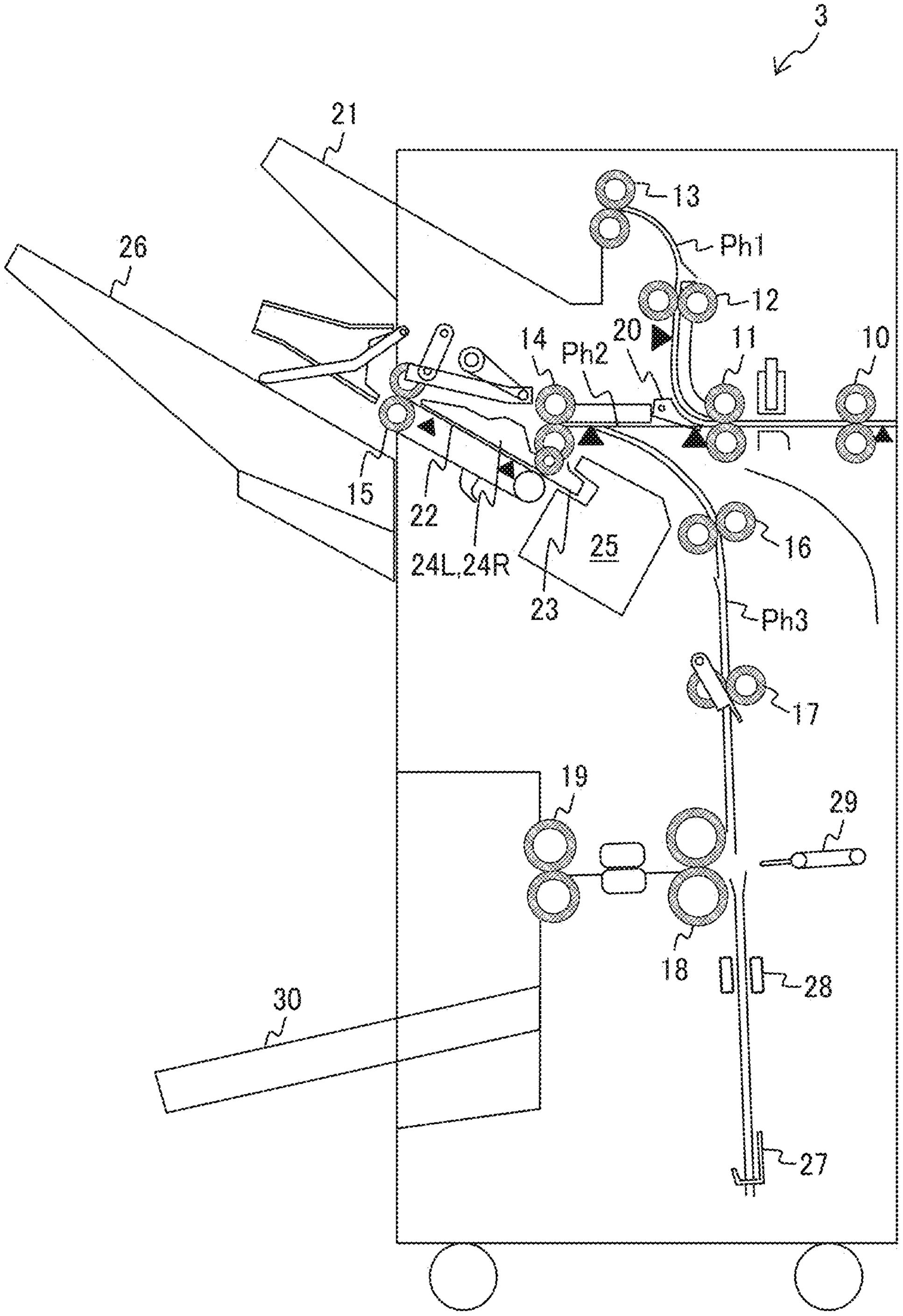
FIG. 2 is a diagram illustrating an internal configuration of a medium processing apparatus according to a first embodiment of the present disclosure.

FIG. 2 is a diagram illustrating an internal configuration of the post-processing apparatus 3 according to the first embodiment of the present disclosure. The post-processing apparatus 3 performs post-processing on the sheet P on which an image is formed by the image forming apparatus 2. The post-processing according to the present embodiment includes binding without using staples. Specifically, the binding without using staples is a process to bind, without using staples, the sheets P on each of which an image is formed as a bundle of sheets P, which may be referred to as a "sheet bundle Pb" in the following description. More specifically, the binding according to the present embodiment is so-called "crimp binding," in other words, pressing and deforming the sheet bundle Pb at a binding position. The binding includes edge stitching as a process to bind an edge of the sheet bundle Pb and saddle stitching as a process to bind the center of the sheet bundle Pb.

The post-processing apparatus 3 includes conveyance roller pairs 10 to 19 (conveying units) and a switching claw 20. The conveyance roller pairs 10 to 19 convey, inside the post-processing apparatus 3, the sheet P supplied from the image forming apparatus 2. Specifically, the conveyance roller pairs 10 to 13 convey the sheet P along a first conveyance passage Ph1. The conveyance roller pairs 14 and 15 convey the sheet P along a second conveyance passage Ph2. The conveyance roller pairs 16 to 19 convey the sheet P along a third conveyance passage Ph3.

The first conveyance passage Ph1 is a passage extending to an output tray 21 from a supply port through which the sheet P is supplied from the image forming apparatus 2. The second conveyance passage Ph2 is a passage branching from the first conveyance passage Ph1 between the conveyance roller pairs 11 and 14 in a conveyance direction and extending to an output tray 26 via an internal tray 22. The third conveyance passage Ph3 is a passage branching from the first conveyance passage Ph1 between the conveyance roller pairs 11 and 14 in the conveyance direction and extending to an output tray 30.

The switching claw 20 is disposed at a branching position of the first conveyance passage Ph1 and the second conveyance passage Ph2.

The switching claw 20 can be switched between a position where the switching claw 20 guides the sheet P to be output to the output tray 21 through the first conveyance passage Ph1 and a position where the switching claw 20 guides the sheet P conveyed through the first conveyance passage Ph1 to the second conveyance passage Ph2. When a trailing end of the sheet P entering the second conveyance passage Ph2 passes through the conveyance roller pair 11, the conveyance roller pair 14 is rotated in the reverse direction to guide the sheet P to the third conveyance passage Ph3. The post-processing apparatus 3 further includes a plurality of sensors that detects the positions of the sheet P in the first conveyance passage Ph1, the second conveyance passage Ph2, and the third conveyance passage Ph3. Each of the plurality of sensors is indicated by a black triangle mark in FIG. 2.

The post-processing apparatus 3 includes the output tray 21. The output tray 21 supports the sheet P output through the first conveyance passage Ph1. Among the sheets P supplied from the image forming apparatus 2, the sheets P that are not bound are output to the output tray 21.

The post-processing apparatus 3 further includes the internal tray 22 (tray), an end fence 23, side fences 24L and 24R, a binding unit 25, and the output tray 26. The internal tray 22, the end fence 23, the side fences 24L and 24R, and the binding unit 25 perform the edge stitching on the sheets P conveyed through the second conveyance passage Ph2. Among the sheets P supplied from the image forming apparatus 2, the sheet bundle Pb subjected to the edge stitching is output to the output tray 26. In the following description, a direction from the conveyance roller pair 15 toward the end fence 23 is defined as a "conveyance direction of the sheet (or sheets) P." A direction orthogonal to the surface of the sheet P and to the conveyance direction of the sheet (or sheets) P is defined as a "main scanning direction (width direction of the sheet (or sheets) P)."

The internal tray 22 temporarily supports the sheets P sequentially conveyed through the second conveyance passage Ph2. The end fence 23 aligns the position, in the conveyance direction, of the sheet P or the sheet bundle Pb supported on the internal tray 22. The side fences 24L and 24R align the position, in the main scanning direction, of the sheet P or the sheet bundle Pb supported on the internal tray 22. The binding unit 25 binds an end of the sheet bundle Pb aligned by the end fence 23 and the side fences 24L and 24R. Then, the conveyance roller pair 15 outputs the sheet bundle Pb subjected to the edge stitching to the output tray 26.

Figure 3:
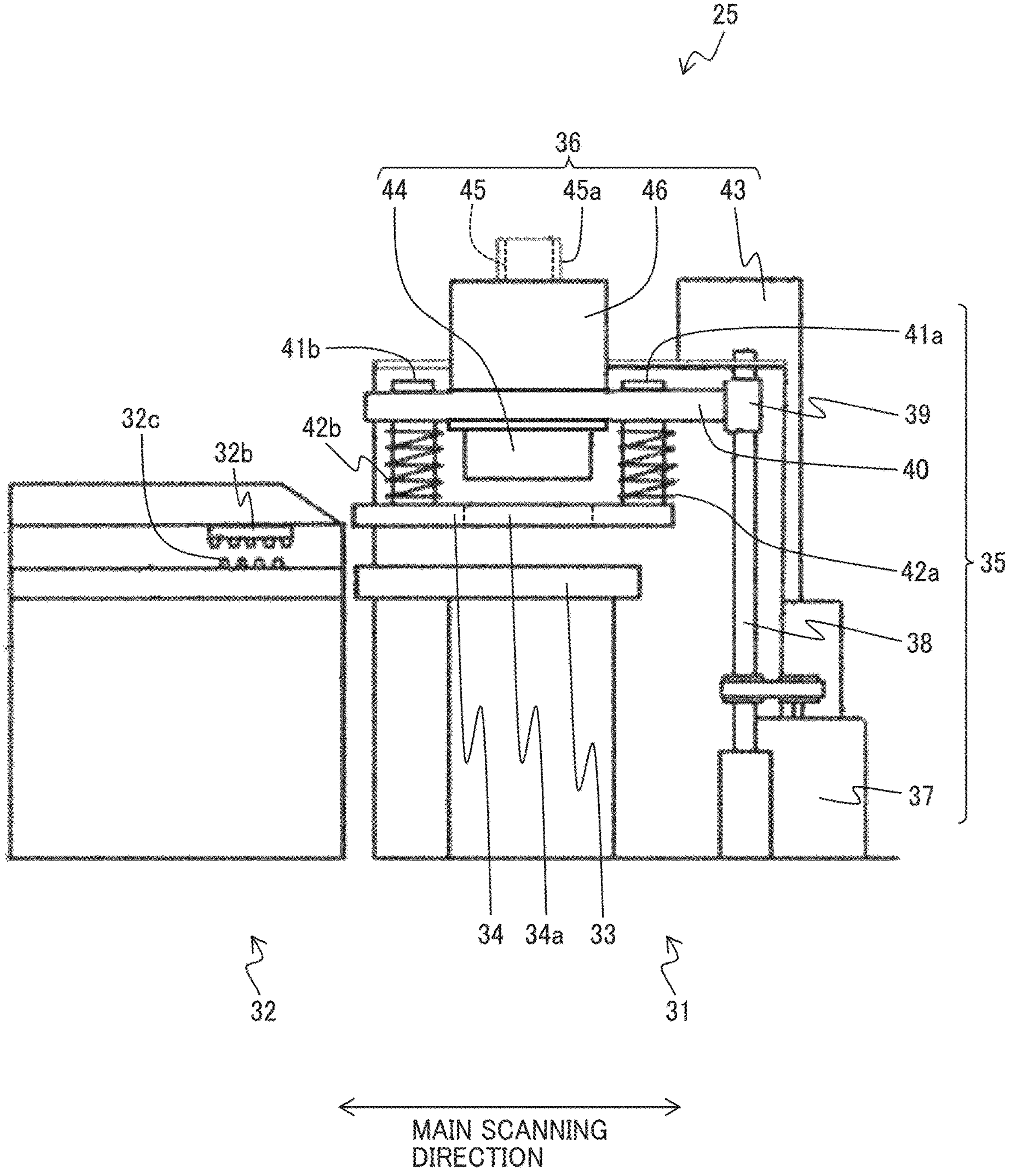
FIG. 3 is a schematic view of an upstream side of a binding unit of the medium processing apparatus in a conveyance direction, according to the first embodiment of the present disclosure.
Figure 4:
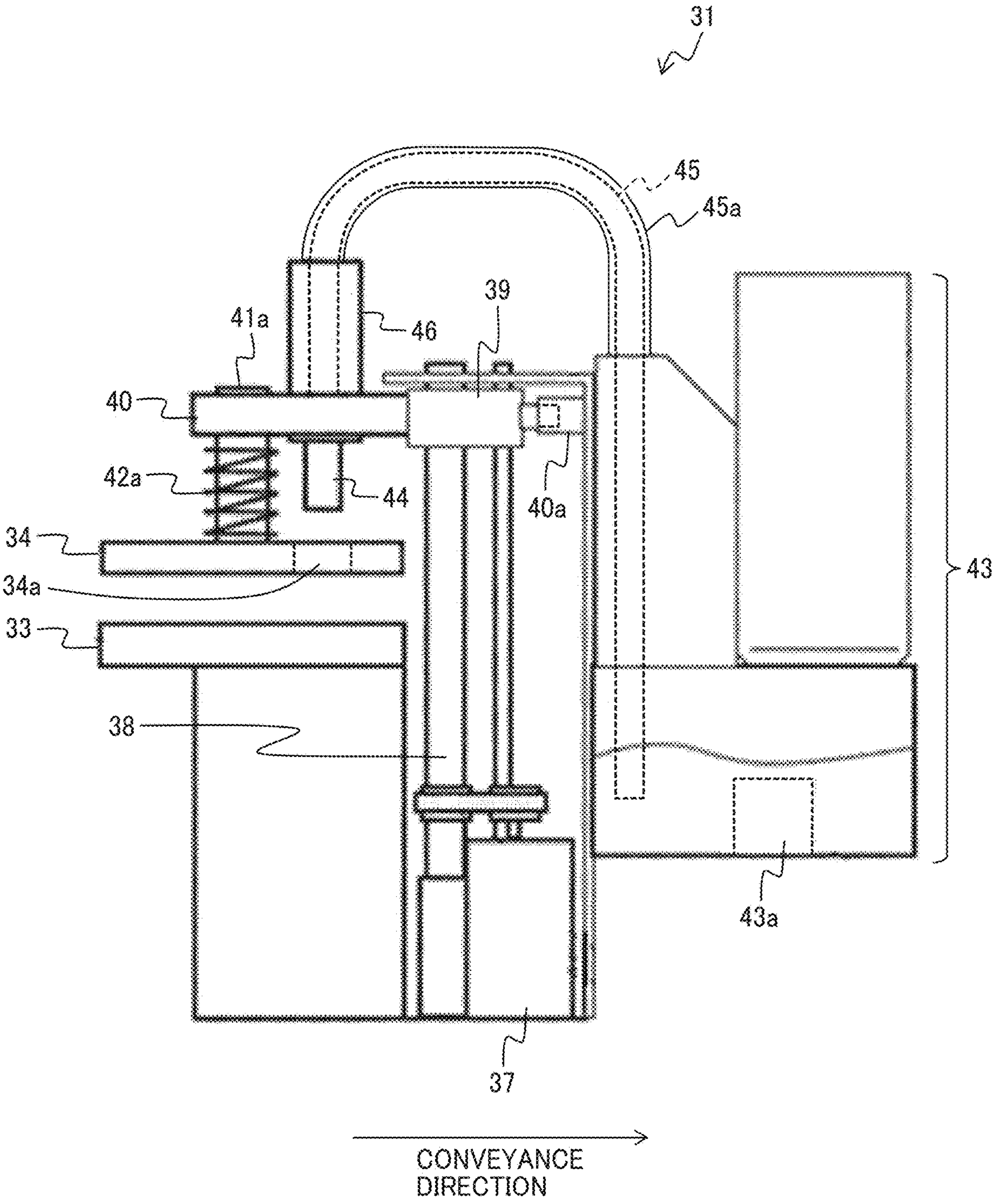
FIG. 4 is a schematic view of a liquid applier of the binding unit of FIG. 3 in a main scanning direction, according to the first embodiment of the present disclosure.

FIG. 3 is a schematic view of an upstream side of the binding unit 25 in the conveyance direction, according to the first embodiment of the present disclosure. FIG. 4 is a schematic view of a liquid applier 31 of the binding unit 25 in the main scanning direction, according to the first embodiment of the present disclosure. As illustrated in FIG. 3, the binding unit 25 includes the liquid applier 31 and a crimper 32. The liquid applier 31 and the crimper 32 are disposed downstream from the internal tray 22 in the conveyance direction and adjacent to each other in the main scanning direction.

The liquid applier 31 applies liquid (for example, water) that is stored in a liquid storage tank 43 to the sheet P supported on the internal tray 22. In the following description, the application of liquid may be referred to as "liquid application." The liquid applier 31 can be moved in the main scanning direction by a driving force transmitted from a liquid application motor 31*a* (see FIG. 8). As illustrated in FIGS. 3 and 4, the liquid applier 31 includes a lower pressure plate 33, an upper pressure plate 34 (presser), a movement mechanism 35, and a liquid application mechanism 36.

More specifically, the liquid that is stored in the liquid storage tank 43 for the "liquid application" includes, as a main component, a liquid hydrogen-oxygen compound represented by the chemical formula $H_2O$. The liquid hydrogen-oxygen compound is at any temperature. For example, the liquid hydrogen-oxygen compound may be so-called warm water or hot water. The liquid hydrogen-oxygen compound is not limited to pure water. The liquid hydrogen-oxygen compound may be purified water or may contain ionized salts. The metal ion content ranges from so-called soft water to ultrahard water. In other words, the liquid hydrogen-oxygen compound is at any hardness.

The liquid stored in the liquid storage tank 43 may include an additive in addition to the main component. The liquid stored in the liquid storage tank 43 may include residual chlorine used as tap water. Preferably, for example, the liquid stored in the liquid storage tank 43 may include, as additives, a colorant, a penetrant, a pH adjuster, a preservative such as phenoxyethanol, a drying inhibitor such as glycerin, or a combination thereof. Since water is used as a component of ink used for inkjet printers or ink used for water-based pens, such water or ink may be used as the liquid.

The water is not limited to the specific examples described above. The water may be water in a broad sense such as hypochlorous acid water or an ethanol aqueous solution diluted for disinfection. However, tap water may be used simply for the purpose of crimp binding because the tap water is easy to obtain and manage. A liquid including water as a main component as exemplified above enhances the binding strength of the sheet bundle Pb, as compared with a liquid of which the main component is not water.

The lower pressure plate 33 and the upper pressure plate 34 are disposed downstream from the internal tray 22 in the conveyance direction. The lower pressure plate 33 supports, from below, the sheet P or the sheet bundle Pb supported on the internal tray 22. The upper pressure plate 34 can move above the sheet P or the sheet bundle Pb supported on the internal tray 22. In other words, the lower pressure plate 33 and the upper pressure plate 34 are disposed to face each other in a thickness direction of the sheet P or the sheet bundle Pb with the sheet P or the sheet bundle Pb supported on the internal tray 22 and interposed between the lower pressure plate 33 and the upper pressure plate 34. In the following description, the thickness direction of the sheet P or the sheet bundle Pb may be referred to simply as the "thickness direction." The upper pressure plate 34 has a through hole 34*a* penetrating in the thickness direction at a position where the through hole 34*a* faces an end of a liquid application member 44 supported by a base plate 40.

Figure 5A:
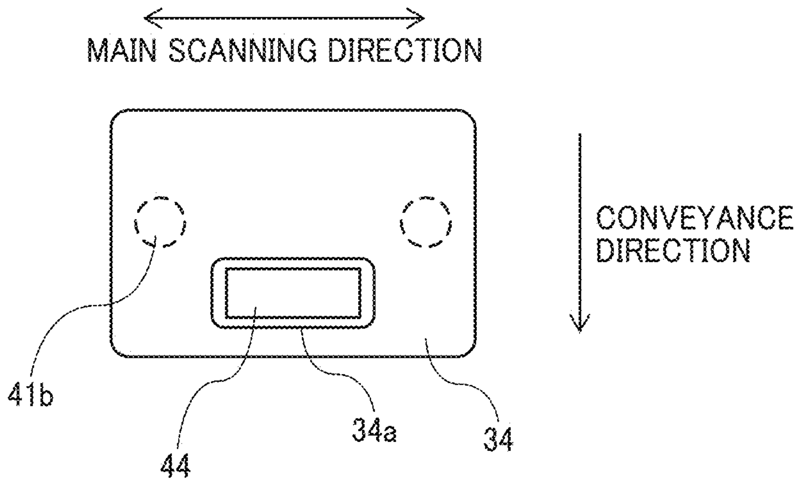
FIGS. 5A and 5B are diagrams illustrating different configurations of an upper pressure plate according to the first embodiment of the present disclosure.

FIG. 5A is a bottom, plan view of the upper pressure plate 34 according to the first embodiment of the present disclosure. In other words, FIG. 5A illustrates the upper pressure plate 34 viewed from below, from where the lower pressure plate 33 exists in FIG. 3. The upper pressure plate 34 has the through hole 34*a* so that the liquid application member 44 can move through the upper pressure plate 34. As illustrated in FIG. 5A, the upper pressure plate 34 is disposed so as to surround the liquid application member 44. Such a configuration reliably prevents bending or curling in the vicinity of the liquid application position of the sheet P or the sheet bundle Pb when the liquid application member 44 applies liquid to the sheet P or the sheet bundle Pb. Accordingly, the liquid application member 44 can uniformly apply the liquid to the sheet P or the sheet bundle Pb. Further, the sheet P or the sheet bundle Pb is reliably peeled off from the liquid application member 44 after the liquid is applied to the sheet P or the sheet bundle Pb.

Figure 5B:
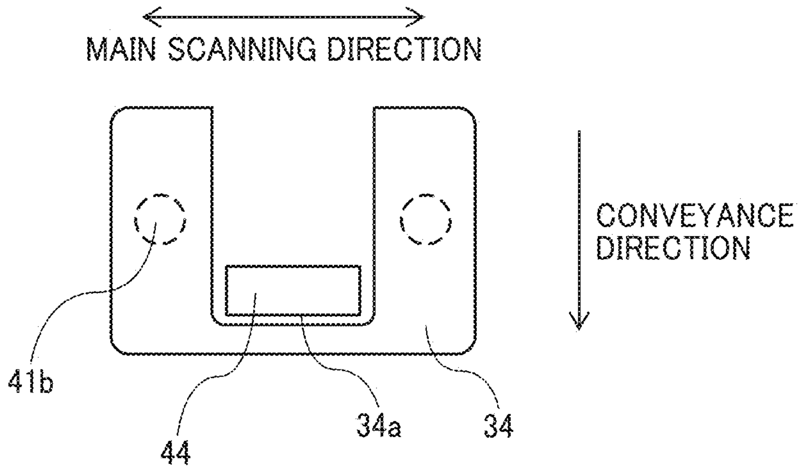

Alternatively, as illustrated in FIG. 5B, the through hole 34*a* may be formed by cutting out a part of the outer shape of the upper pressure plate 34. In other words, the upper pressure plate 34 may be shaped to surround one side of the liquid application member 44 in the conveyance direction and two sides of the liquid application member 44 in the main scanning direction. The upper pressure plate 34 in such a shape attains substantially the same operational advantage as the upper pressure plate 34 illustrated in FIG. 5A.

Figure 6A:
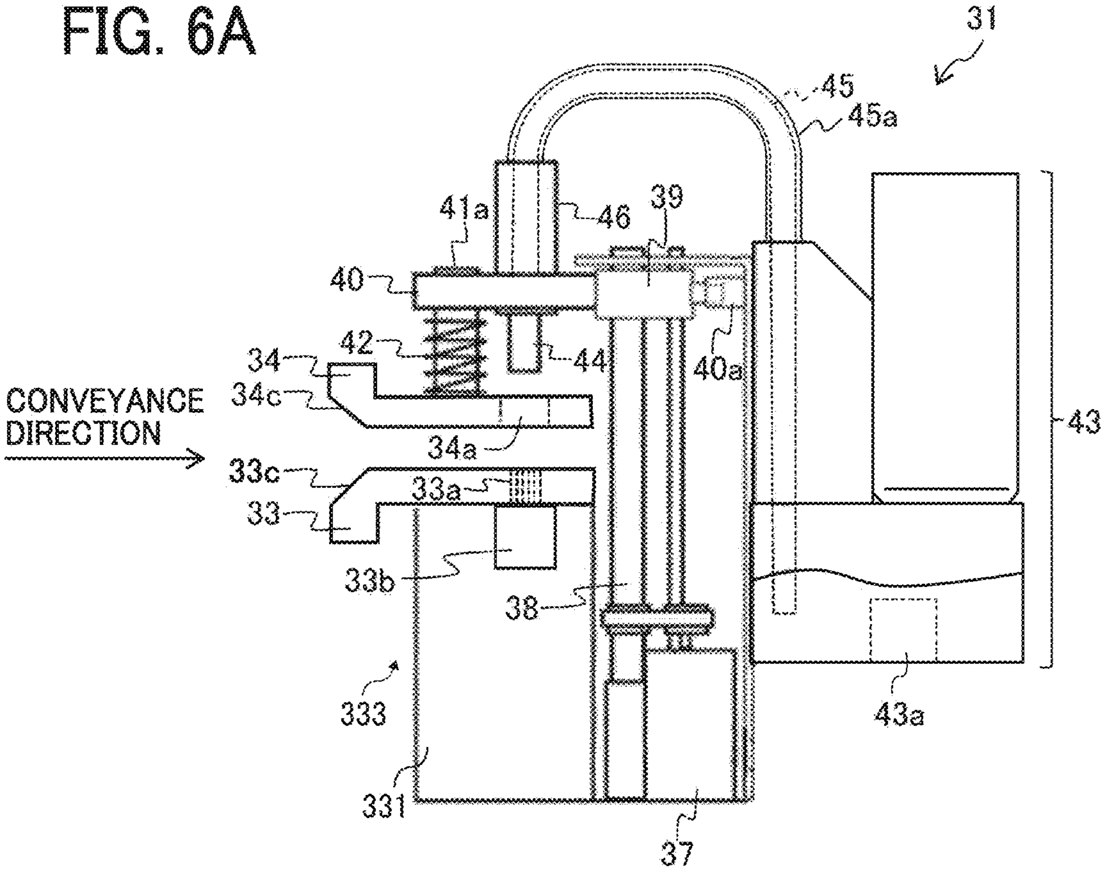
FIGS. 6A to 6D are views of an upper pressure plate and a lower pressure plate according to a modification of the first embodiment of the present disclosure.
Figure 6B:
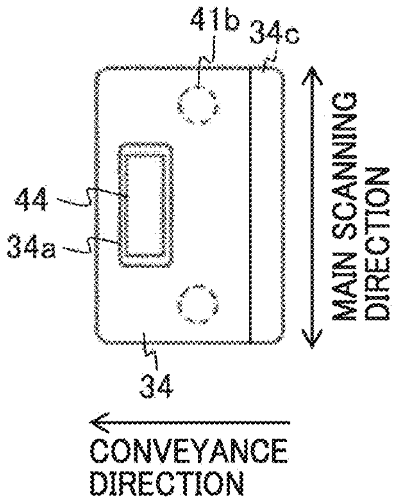
Figure 6C:
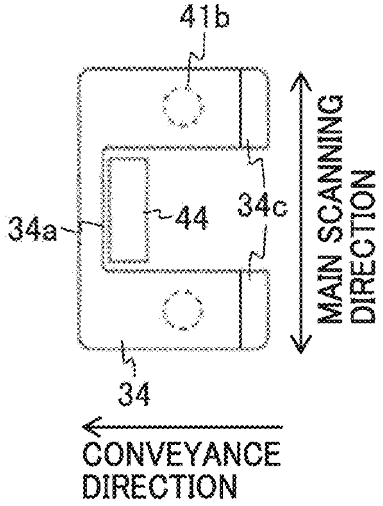
Figure 6D:
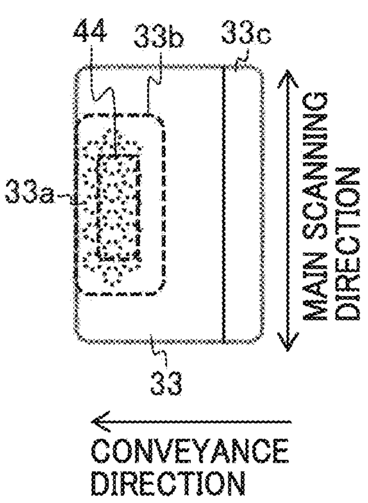

FIGS. 6A to 6D illustrate an upper pressure plate 34 and a lower pressure plate 33 according to a modification of the first embodiment of the present disclosure. Specifically, FIG. 6A corresponds to FIG. 4. FIG. 6B illustrates the upper pressure plate 34 that corresponds to the upper pressure plate 34 illustrated in FIG. 5A with an inclined portion. FIG. 6C illustrates the upper pressure plate 34 that corresponds to the upper pressure plate 34 illustrated in FIG. 5B with an inclined portion. FIG. 6D is a top view of the lower pressure plate 33 illustrated in FIG. 6A. In other words, FIG. 6D illustrates the lower pressure plate 33 viewed from above, from where the upper pressure plate 34 exists in FIG. 6A.

According to the present modification, as illustrated in FIGS. 6A to 6D, the upper pressure plate 34 includes an inclined portion 34*c* that guides the sheet P conveyed toward the inclined portion 34*c* (at an upstream side of the upper pressure plate 34 in the conveyance direction). Similarly, the lower pressure plate 33 includes an inclined portion 33*c* that guides the sheet P conveyed toward the inclined portion 33*c* (at an upstream side of the lower pressure plate 33 in the conveyance direction). Thus, the sheet P is stably guided between the upper pressure plate 34 and the lower pressure plate 33. Alternatively, either the upper pressure plate 34 or the lower pressure plate 33 may include such an inclined portion.

As illustrated in FIG. 6D, the lower pressure plate 33 may have a through hole 33*a* to allow excess liquid to escape after the liquid application. In this case, a drainage tray 33*b* receives the excess liquid drained through the through hole 33*a*. The through hole 33*a* is disposed so as to overlap a liquid application area where the liquid application member 44 contacts the sheet P or the sheet bundle Pb, to efficiently drain the excess liquid after the liquid application. The drainage tray 33*b* is removable from a lower-pressure-plate holder 331, alone or together with the lower pressure plate 33, to allow a user to periodically discard the drainage.

According to the present embodiment, the upper pressure plate 34 serves as a presser that presses at least one sheet P. The drainage tray 33*b* serves as a drainage unit disposed at a side of the lower pressure plate 33 opposite to a contact face of the lower pressure plate 33 that contacts the sheet P or the sheet bundle Pb. The lower pressure plate 33 serves as an opposed member that contacts the sheet P or the sheet bundle Pb. The lower-pressure-plate holder 331 serves as a holding unit that holds the opposed member. The lower pressure plate 33 and the lower-pressure-plate holder 331 are included in an opposed unit 333 that sandwiches the sheet P or the sheet bundle Pb with the presser. When the drainage tray 33*b* is removable from the lower-pressure-plate holder 331 alone as described above, the drainage tray 33*b* is removed independently of the lower pressure plate 33.

The movement mechanism 35 moves the upper pressure plate 34, the base plate 40 (base member), and the liquid application member 44 in the thickness direction of the sheet bundle Pb. The movement mechanism 35 according to the present embodiment moves the upper pressure plate 34, the base plate 40, and the liquid application member 44 in conjunction with each other with a single movement motor 37 (driving source). The movement mechanism 35 includes, for example, the movement motor 37, a trapezoidal screw 38, a nut 39, the base plate 40, columnar members 41*a* and 41*b*, and coil springs 42*a* and 42*b* (biasing members).

The movement motor 37 generates a driving force to move the upper pressure plate 34, the base plate 40, and the liquid application member 44. The trapezoidal screw 38 extends in a vertical direction in, for example, FIGS. 3 and 4 and is rotatably supported by a frame of the binding unit 25. The trapezoidal screw 38 is coupled to an output shaft of the movement motor 37 via, for example, a pulley and a belt. The nut 39 is screwed to the trapezoidal screw 38. The trapezoidal screw 38 is rotated by the driving force transmitted from the movement motor 37. The rotation of the trapezoidal screw 38 moves the nut 39.

The base plate 40 is disposed above the upper pressure plate 34. The base plate 40 supports the liquid application member 44 with the end of the liquid application member 44 projecting downward. The base plate 40 is coupled to the trapezoidal screw 38 to move together with the trapezoidal screw 38. The position of the base plate 40 in the vertical direction is detected by a movement sensor 40*a*.

The columnar members 41*a* and 41*b* project downward from the base plate 40 around the end of the liquid application member 44. The columnar members 41*a* and 41*b* can move relative to the base plate 40 in the thickness direction. The columnar members 41*a* and 41*b* have respective lower ends supporting or holding the upper pressure plate 34. The columnar members 41*a* and 41*b* have respective upper ends provided with stoppers that prevent the columnar members 41*a* and 41*b* from being removed from the base plate 40. The coil springs 42*a* and 42*b* are fitted around the columnar members 41*a* and 41*b*, respectively, between the base plate 40 and the upper pressure plate 34. The coil springs 42*a* and 42*b* bias the upper pressure plate 34 and the columnar members 41*a* and 41*b* downward with respect to the base plate 40.

The liquid application mechanism 36 applies liquid to the sheet P or the sheet bundle Pb supported on the internal tray 22. Specifically, the liquid application mechanism 36 brings the end of the liquid application member 44 into contact with the sheet P or the sheet bundle Pb to apply the liquid to at least one sheet P of the sheet bundle Pb. The liquid application mechanism 36 includes the liquid storage tank 43, the liquid application member 44, a supply member 45, and a joint 46.

The liquid storage tank 43 stores the liquid to be supplied to the sheet P or the sheet bundle Pb. The amount of liquid stored in the liquid storage tank 43 is detected by a liquid amount sensor 43*a*. The liquid application member 44 supplies the liquid stored in the liquid storage tank 43 to the sheet P or the sheet bundle Pb. The liquid application member 44 is supported by the base plate 40 with the end of the liquid application member 44 facing downward. The liquid application member 44 is made of a material having a relatively high liquid absorption (for example, sponge or fiber).

The supply member 45 is an elongated member having a base end immersed in the liquid stored in the liquid storage tank 43 and an end coupled to the liquid application member 44. Like the liquid application member 44, for example, the supply member 45 is made of a material having a relatively high liquid absorption. Accordingly, the liquid absorbed from the base end of the supply member 45 is supplied to the liquid application member 44 by capillary action.

A protection member 45*a* is an elongated cylindrical body (for example, a tube) that is fitted around the supply member 45. Such a configuration prevents the liquid absorbed by the supply member 45 from leaking or evaporating. Each of the supply member 45 and the protection member 45*a* is made of a flexible material. The joint 46 fixes the liquid application member 44 to the base plate 40. Accordingly, the liquid application member 44 keeps projecting downward from the base plate 40 with the end of the liquid application member 44 facing downward when the liquid application member 44 is moved by the movement mechanism 35.

The crimper 32 presses and deforms the sheet bundle Pb with serrate binding teeth to bind the sheet bundle Pb. In the following description, such a binding way may be referred to as "crimp binding." In other words, the crimper 32 crimps and binds the sheet bundle Pb or performs the crimp binding on the sheet bundle Pb. In short, the crimper 32 binds the sheet bundle Pb without using staples. The crimper 32 can be moved in the main scanning direction independently of the liquid applier 31 by a driving force transmitted from a crimping motor 32*a* (see FIG. 8).

Figure 7A:
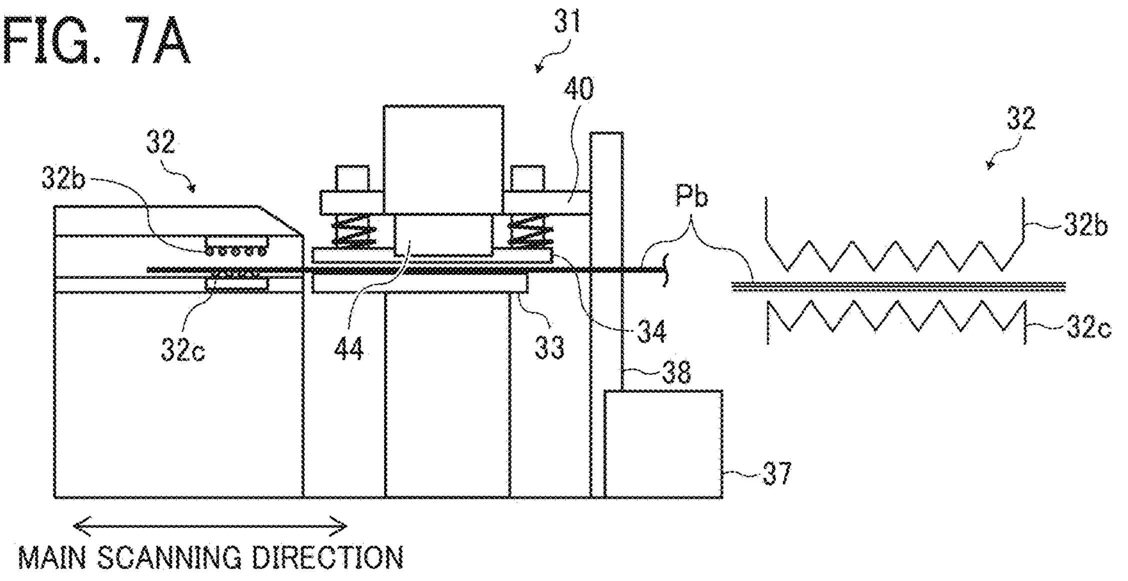
FIGS. 7A to 7C are diagrams illustrating a configuration and a process of a crimper of the medium processing apparatus according to the first embodiment of the present disclosure.
Figure 7B:
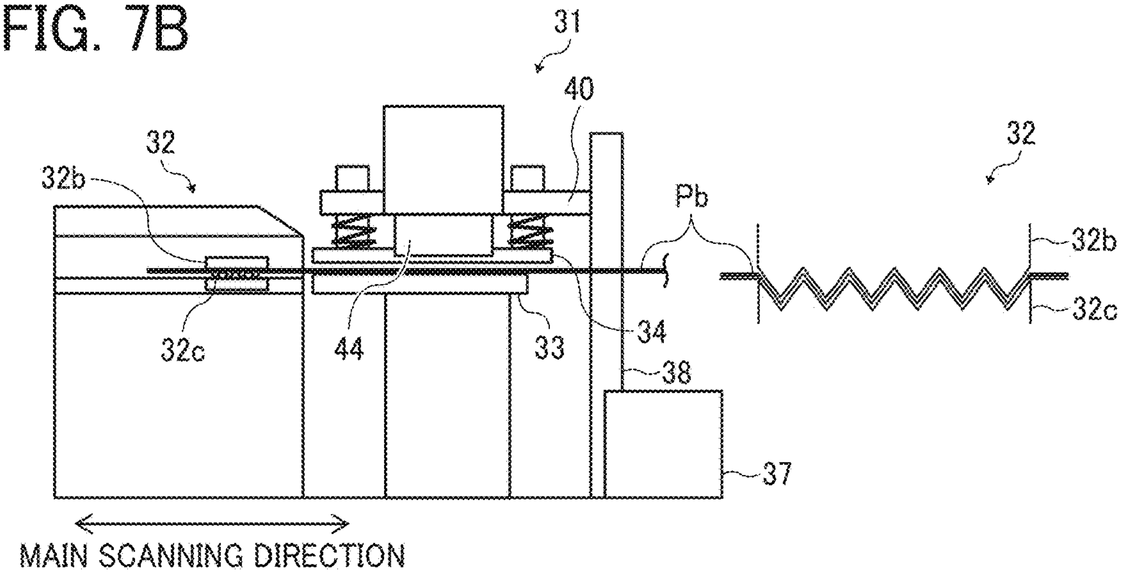
Figure 7C:
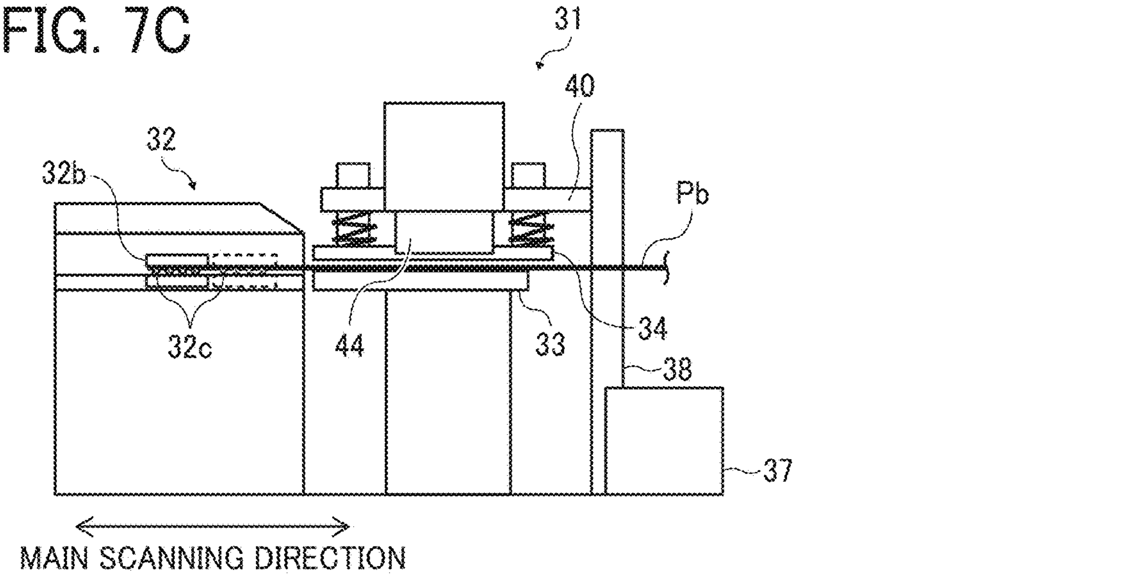

FIGS. 7A to 7C are diagrams illustrating the configuration of the crimper 32. As illustrated in FIGS. 7A to 7C, the crimper 32 includes a first member 32*b* (upper crimping teeth) and a second member 32*c* (lower crimping teeth). The first member 32*b* and the second member 32*c* are disposed to face each other in the thickness direction of the sheet bundle Pb with the sheet bundle Pb supported on the internal tray 22 and interposed between the first member 32*b* and the second member 32*c*. Serrate binding teeth including concave portions and convex portions alternately formed are formed on a face of the first member 32*b* and a face of the second member 32*c* facing each other. The concave portions and the convex portions of the binding teeth of the first member 32*b* are shifted from those of the binding teeth of the second member 32*c* so that the binding teeth of the first member 32*b* are engaged with the binding teeth of the second member 32*c*. The first member 32*b* and the second member 32*c* are brought into contact with and separated from each other by a driving force of a contact-separation motor 32*d* (see FIG. 8).

In a process in which the sheets P of the sheet bundle Pb are supplied to the internal tray 22, the first member 32*b* and the second member 32*c* are apart from each other as illustrated in FIG. 7A. When all the sheets P of the sheet bundle Pb are supported on the internal tray 22, the binding teeth of the first member 32*b* and the binding teeth of the second member 32*c* are engaged with each other to press and deform the sheet bundle Pb in the thickness direction as illustrated in FIG. 7B. As a result, the sheet bundle Pb supported on the internal tray 22 is crimped and bound. The sheet bundle Pb thus crimped and bound is output to the output tray 26 by the conveyance roller pair 15.

Figure 8:
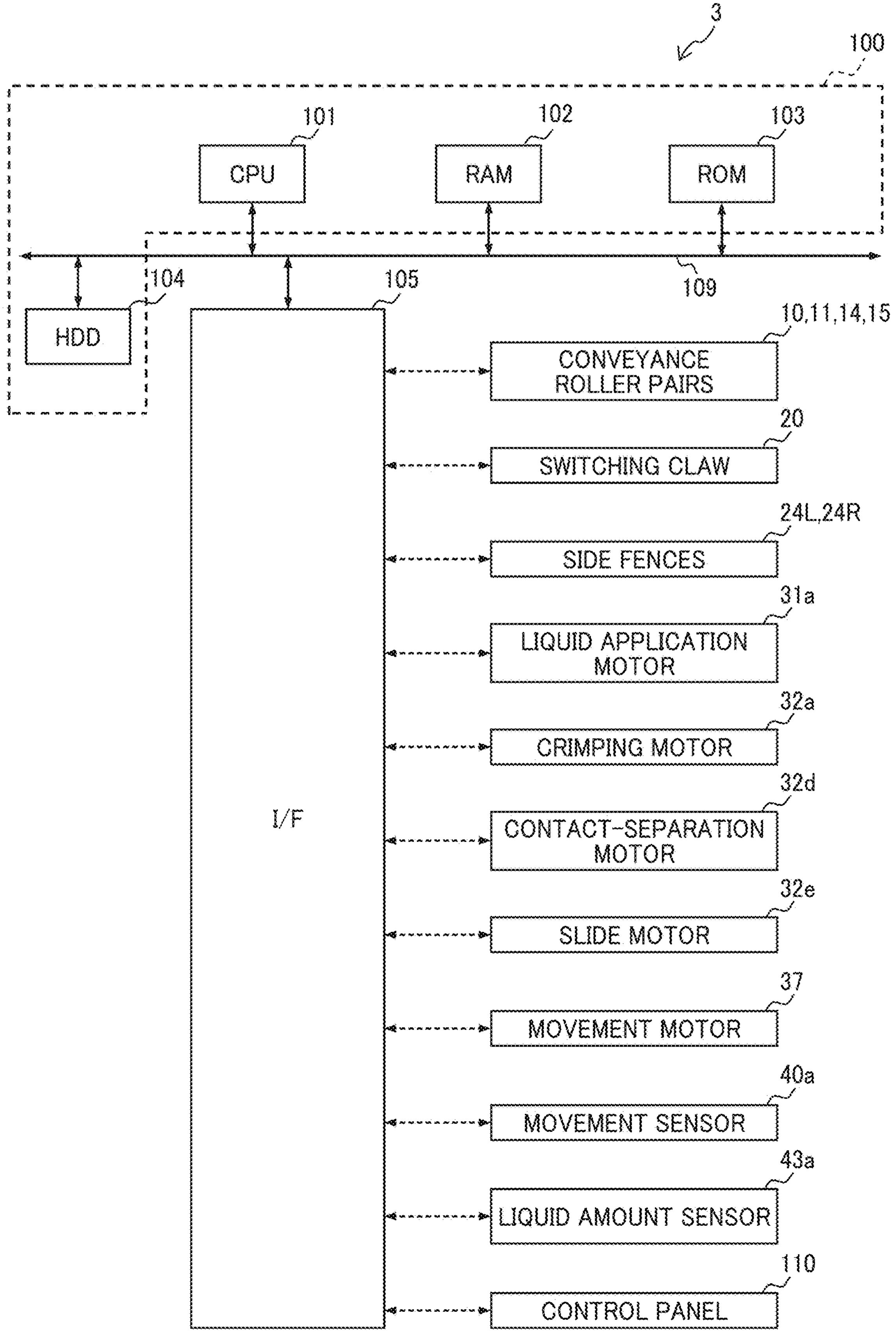
FIG. 8 is a diagram illustrating a hardware configuration of the medium processing apparatus according to the first embodiment of the present disclosure.

As described above, the first member 32*b* and the second member 32*c* are brought into contact with and separated from each other by the driving force of the contact-separation motor 32*d* (see FIG. 8). Further, as illustrated in FIG. 7C, both the first member 32*b* and the second member 32*c* may move together in the main scanning direction by a driving force of a slide motor 32*e* (see FIG. 8). Such a configuration allows the first member 32*b* and the second member 32*c* to bind the sheet bundle Pb twice in parallel, thus doubling the width of crimping marks left by the crimping teeth. In short, such a configuration enhances the binding strength for the sheets P having a relatively large stiffness or for the sheets P which the liquid does not easily permeate.

The configuration of the crimper 32 as a crimping mechanism is not limited to the configuration of the present embodiment provided that the first member 32*b* and the second member 32*c* of the crimping mechanism are engaged with each other. For example, the crimping mechanism may bring the first member 32*b* and the second member 32*c* into contact with each other and separate the first member 32*b* and the second member 32*c* form each other with a link mechanism and a driving source that simply rotates forward or that rotates forward and backward (for example, the crimping mechanism disclosed in Japanese Patent No. 6057167). Alternatively, the crimping mechanism may employ a linear motion system to linearly bring the first member 32*b* and the second member 32*c* into contact with each other and separate the first member 32*b* and the second member 32*c* form each other with a screw mechanism that converts the rotational motion of a driving source into linear motion.

Referring back to FIG. 2, the post-processing apparatus 3 further includes an end fence 27, a binding unit 28, a sheet folding blade 29, and the output tray 30. The end fence 27, the binding unit 28, and the sheet folding blade 29 perform the saddle stitching on the sheets P conveyed through the third conveyance passage Ph3. Among the sheets P supplied from the image forming apparatus 2, the sheet bundle Pb subjected to the saddle stitching is output to the output tray 30.

The end fence 27 aligns the positions, in the conveyance direction, of the sheets P sequentially conveyed through the third conveyance passage Ph3. The end fence 27 can move between a binding position where the end fence 27 causes the center of the sheet bundle Pb to face the binding unit 28 and a folding position where the end fence 27 causes the center of the sheet bundle Pb to face the sheet folding blade 29. The binding unit 28 binds the center of the sheet bundle Pb aligned by the end fence 27 at the binding position. The sheet folding blade 29 folds, in half, the sheet bundle Pb supported by the end fence 27 at the folding position and causes the conveyance roller pair 18 to sandwich the sheet bundle Pb. The conveyance roller pairs 18 and 19 output the sheet bundle Pb subjected to the saddle stitching to the output tray 30.

FIG. 8 is a diagram illustrating a hardware configuration of the post-processing apparatus 3 according to the first embodiment of the present disclosure. As illustrated in FIG. 8, the post-processing apparatus 3 includes a central processing unit (CPU) 101, a random access memory (RAM) 102, a read only memory (ROM) 103, a hard disk drive (HDD) 104, and an interface (I/F) 105. The CPU 101, the RAM 102, the ROM 103, the HDD 104, and the I/F 105 are connected to each other via a common bus 109.

The CPU 101 is an arithmetic unit and controls the overall operation of the post-processing apparatus 3. The RAM 102 is a volatile storage medium that allows data to be read and written at high speed. The CPU 101 uses the RAM 102 as a work area for data processing. The ROM 103 is a read-only non-volatile storage medium that stores programs such as firmware. The HDD 104 is a non-volatile storage medium that allows data to be read and written and has a relatively large storage capacity. The HDD 104 stores, for example, an operating system (OS), various control programs, and application programs.

By an arithmetic function of the CPU 101, the post-processing apparatus 3 processes, for example, a control program stored in the ROM 103 and an information processing program (application program) loaded into the RAM 102 from a storage medium such as the HDD 104. Such processing configures a software controller including various functional modules of the post-processing apparatus 3. The software controller thus configured cooperates with hardware resources of the post-processing apparatus 3 to construct functional blocks that implement functions of the post-processing apparatus 3. In other words, the CPU 101, the RAM 102, the ROM 103, and the HDD 104 construct a controller 100 that controls the operation of the post-processing apparatus 3.

The I/F 105 is an interface that connects the conveyance roller pairs 10, 11, 14, and 15, the switching claw 20, the side fences 24L and 24R, the liquid application motor 31*a*, the crimping motor 32*a*, the contact-separation motor 32*d*, the slide motor 32*e*, the movement motor 37, the movement sensor 40*a*, the liquid amount sensor 43*a*, and a control panel 110 to the common bus 109. The controller 100 operates, via the I/F 105, the conveyance roller pairs 10, 11, 14, and 15, the switching claw 20, the side fences 24L and 24R, the liquid application motor 31*a*, the crimping motor 32*a*, the contact-separation motor 32*d*, the slide motor 32*e*, and the movement motor 37. Although FIG. 8 illustrates the components that execute the edge stitching, the components that execute the saddle stitching are controlled by the controller 100 like the components that execute the edge stitching.

The control panel 110 includes an operation unit that receives instructions from a user and a display (notification unit) that notifies the user of information. The operation unit includes, for example, hard keys and a touch panel superimposed on a display. The control panel 110 acquires information from the user through the operation unit and provides information to the user through the display. Note that a specific example of the notification unit is not limited to the display and may be a light emitting diode (LED) lamp or a speaker.

Figure 9:
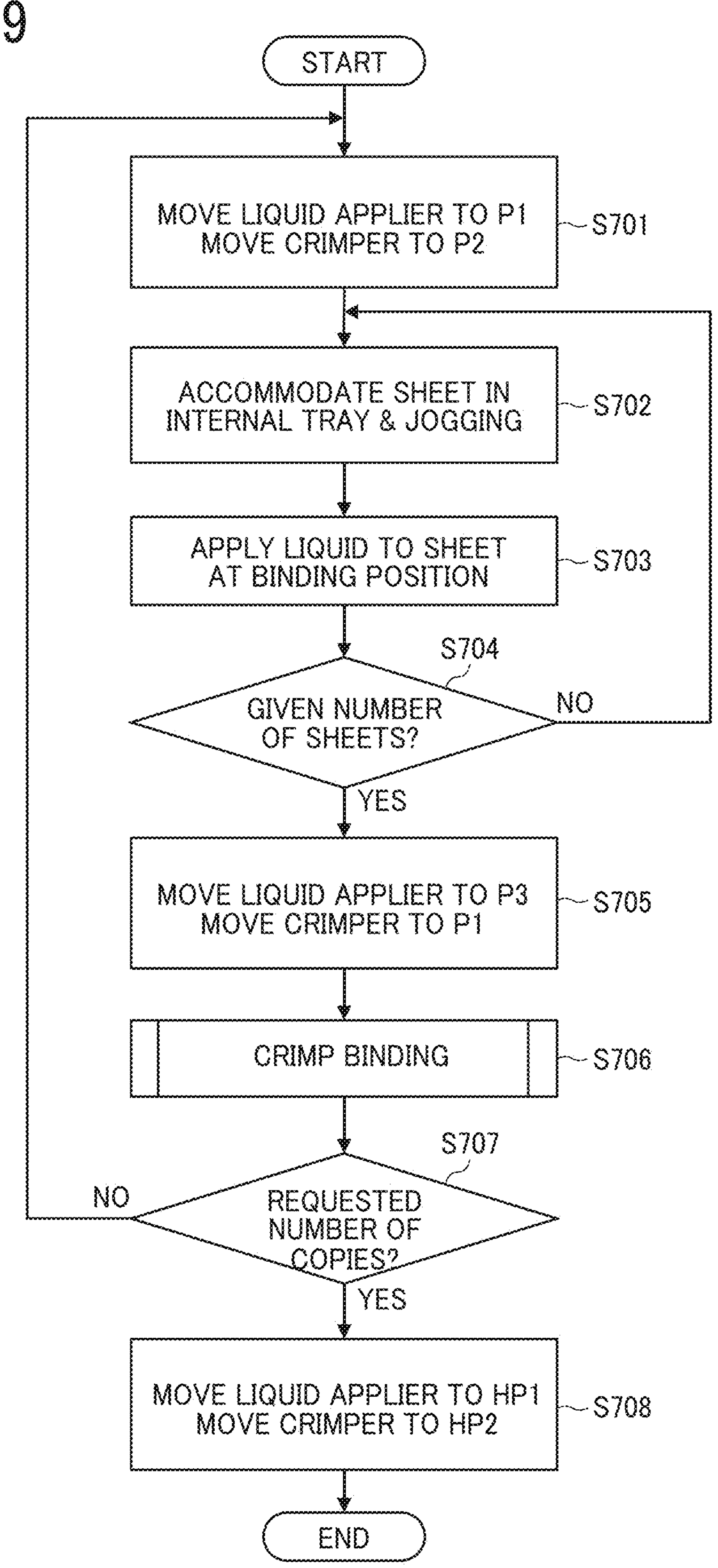
FIG. 9 is a flowchart of a binding process performed by the medium processing apparatus according to the first embodiment of the present disclosure.
Figures 10A, 10B, 10C:
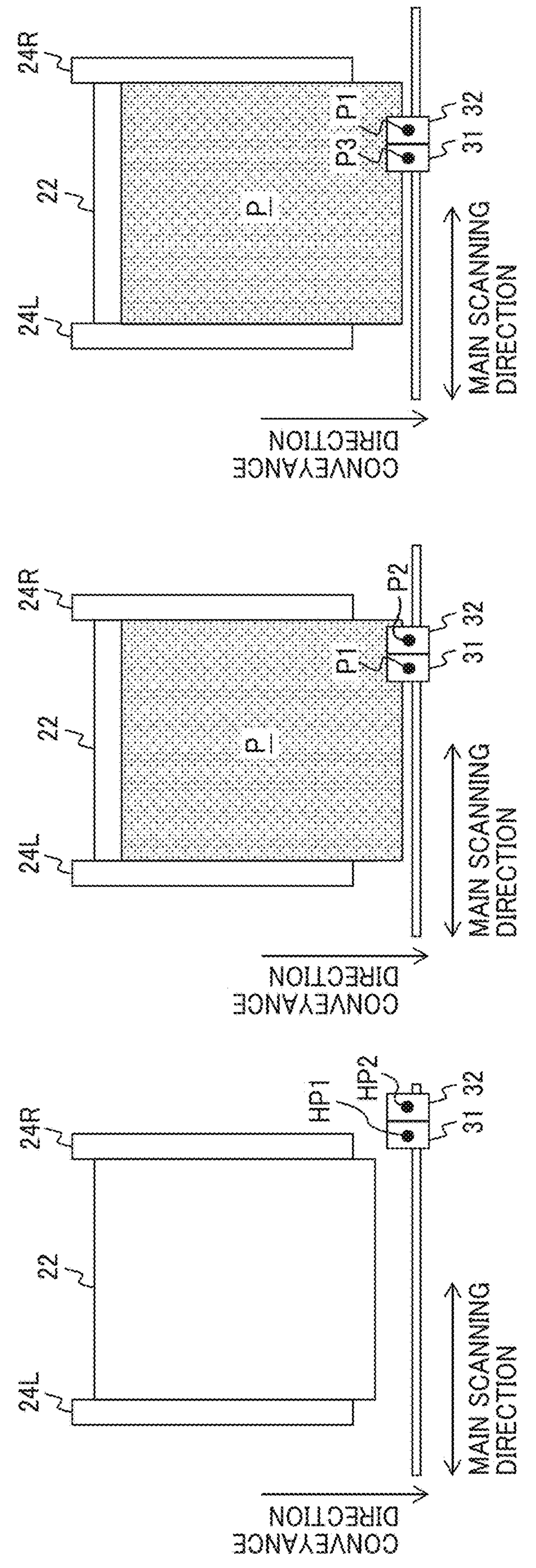
FIGS. 10A to 10C are diagrams illustrating the positions of the liquid applier and the crimper during the binding process of FIG. 9.

FIG. 9 is a flowchart of a binding process according to the first embodiment of the present disclosure. FIGS. 10A to 10C are diagrams illustrating the positions of the liquid applier 31 and the crimper 32 during the binding process. For example, the controller 100 starts the binding process illustrated in FIG. 9 when the controller 100 acquires an instruction to execute the binding process from the image forming apparatus 2. In the following description, the instruction to execute the binding process may be referred to as a "binding command." The binding command includes, for example, the number of sheets P of the sheet bundle Pb and the number of sheet bundles Pb to be bound. In the following description, the number of sheets P of the sheet bundle Pb may be referred to as "given number of sheets" whereas the number of sheet bundles Pb to be bound may be referred to as "requested number of copies."

As illustrated in FIG. 10A, the liquid applier 31 is at a home position HP1 while the crimper 32 is at a home position HP2 at the start of the binding process. The home position HP1 of the liquid applier 31 and the home position HP2 of the crimper 32 are outside the internal tray 22 in the main scanning direction. The home position HP1 of the liquid applier 31 and the home position HP2 of the crimper 32 are different from each other in the main scanning direction. The home position HP1 of the liquid applier 31 according to the present embodiment is closer to the internal tray 22 than the home position HP2 of the crimper 32 in the main scanning direction.

First, in step S701 of FIG. 9, the controller 100 drives the liquid application motor 31*a* to move the liquid applier 31 from the home position HP1 to a binding position P1 and drives the crimping motor 32*a* to move the crimper 32 from the home position HP2 to a binding standby position P2 as illustrated in FIG. 10B. Note that the controller 100 executes the operation of step S701 before a first sheet P is conveyed to the internal tray 22 by the conveyance roller pairs 10, 11, 14, and 15.

At the binding position P1 and the binding standby position P2, the liquid applier 31 and the crimper 32 may face the sheet P supported on the internal tray 22. The binding position P1 and the binding standby position P2 are different from the home positions HP1 and HP2, respectively. The binding position P1 is closer to the center of the sheet P than the binding standby position P2. At the binding position P1, the liquid applier 31 applies liquid to the sheet P in step S703 described below and the crimper 32 performs the crimp binding in step S1004 described below.

At the binding standby position P2, the crimper 32 stands by during an operation of the liquid applier 31.

The binding position P1, the binding standby position P2, and a liquid-application standby position P3 described below may be included in the binding command or may be specified by a user through the control panel 110. For example, the controller 100 may ascertain the positions of the liquid applier 31 and the crimper 32 with encoder sensors attached to the output shafts of the liquid application motor 31*a* and the crimping motor 32*a*.

Next, in step S702, the controller 100 rotates the conveyance roller pairs 10, 11, 14, and 15 to accommodate the sheet P on which an image is formed by the image forming apparatus 2 in the internal tray 22. The controller 100 also moves the side fences 24L and 24R to align the position of the sheet P supported on the internal tray 22 in the main scanning direction. In short, the controller 100 performs so-called jogging.

Figure 11A:
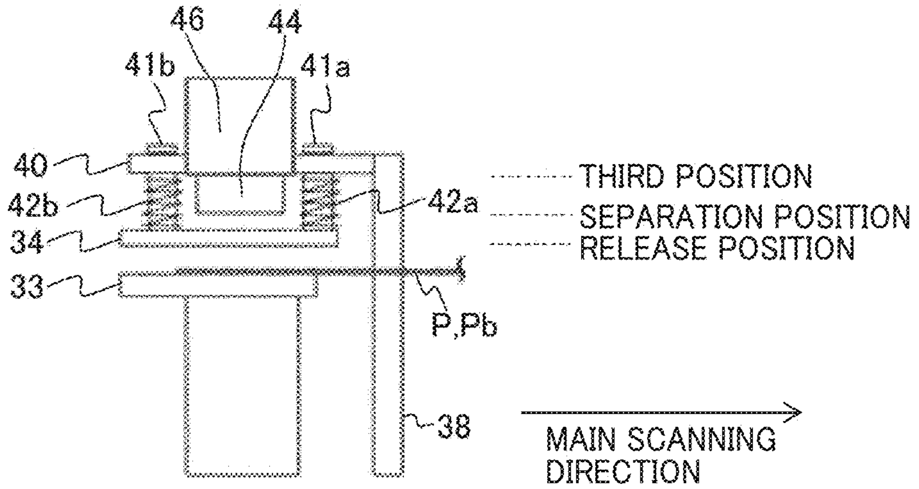
FIGS. 11A to 11C are diagrams illustrating an operation of the liquid applier in a step of the binding process of FIG. 9.
Figure 11B:
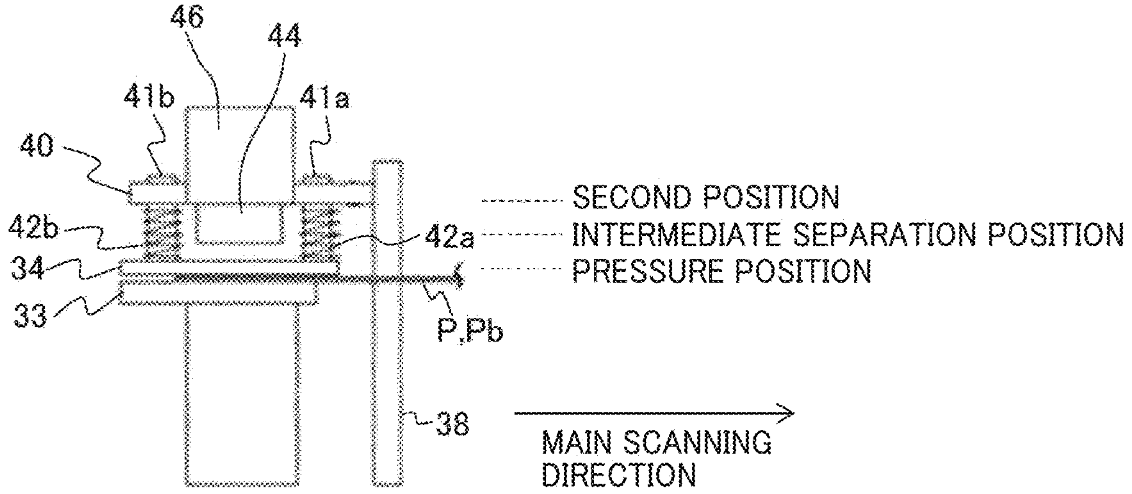
Figure 11C:
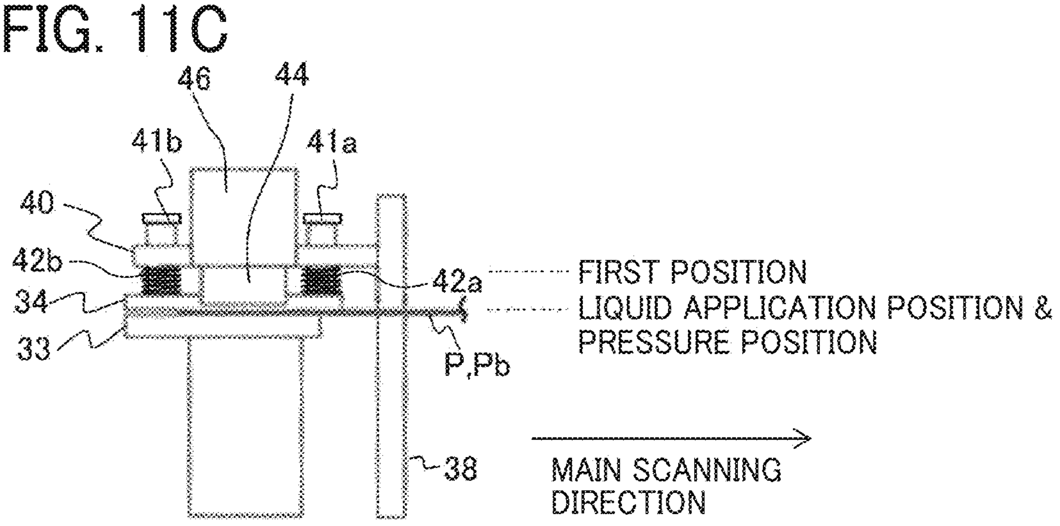

Next, in step S703, the controller 100 causes the liquid applier 31 at the binding position P1 to apply liquid to the sheet P, which is supported on the internal tray 22 in step S702 immediately before step S703. FIGS. 11A to 11C are diagrams illustrating the operation of the liquid applier 31 in step S703. The upper pressure plate 34, the liquid application member 44, and the base plate 40 according to the present embodiment are moved in conjunction with each other by the driving force transmitted from the movement motor 37. Specifically, the upper pressure plate 34, the liquid application member 44, and the base plate 40 are moved down by the rotation of the movement motor 37 in a first direction and moved up by rotation of the movement motor 37 in a second direction opposite to the first direction.

The upper pressure plate 34 moves between a pressure position (FIGS. 11B and 11C) and a release position (FIG. 11A). At the pressure position, the upper pressure plate 34 contacts an upper face of at least one sheet P supported on the internal tray 22 and presses the sheet P from above. The release position is spaced upward from the sheet P or the sheet bundle Pb. In other words, the release position is above the pressure position.

The liquid application member 44 moves between a liquid application position (FIG. 11C) and a separation position (FIG. 11A) via an intermediate separation position (FIG. 11B). At the liquid application position, the liquid application member 44 contacts an upper face of at least one sheet P supported on the internal tray 22 to apply liquid to the sheet P or the sheet bundle Pb. The end of the liquid application member 44 contacts the sheet P or the sheet bundle Pb through the through hole 34*a* of the upper pressure plate 34 at the liquid application position. The separation position and the intermediate separation position are spaced upward from the sheet P or the sheet bundle Pb. The end of the liquid application member 44 is above the through hole 34*a* at the separation position and the intermediate separation position. In other words, the separation position and the intermediate separation position are above the liquid application position.

The base plate 40 moves between a first position (FIG. 11C), a second position (FIG. 11B), and a third position (FIG. 11A). At the first position, the upper pressure plate 34 is at the pressure position while the liquid application member 44 is at the liquid application position. At the second position, the upper pressure plate 34 is at the pressure position while the liquid application member 44 is at the intermediate separation position where the liquid application member 44 is apart from the sheet P or the sheet bundle Pb. When the base plate 40 is at the second position, the liquid application member 44 is between the liquid application position and the separation position. At the third position, the upper pressure plate 34 is at the release position while the liquid application member 44 is at the separation position. In other words, the second position is above the first position whereas the third position is above the second position. For example, the controller 100 may ascertain the position of the base plate 40 with the movement sensor 40*a* and a rotary encoder of the movement motor 37.

As illustrated in FIG. 11A, the base plate 40 is at the third position before the liquid is applied to the sheet P or the sheet bundle Pb. In other words, the upper pressure plate 34 and the liquid application member 44 are apart from the upper face of the sheet P or the sheet bundle Pb already supported on the internal tray 22. For this reason, the sheet P that is newly supplied to the internal tray 22 by the conveyance roller pair 15 enters between the lower pressure plate 33 and the upper pressure plate 34 and rests on the sheet P or the sheet bundle Pb already supported on the internal tray 22.

Next, the controller 100 rotates the movement motor 37 in the first direction to move down the base plate 40 at the third position. When the base plate 40 is moved down and reaches the second position as illustrated in FIG. 11B, the sheet P or the sheet bundle Pb is pressed by the upper pressure plate 34. However, at this point in time, the liquid application member 44 is not yet in contact with the sheet P or the sheet bundle Pb. In other words, the upper pressure plate 34 reaches the pressure position before the liquid application member 44 reaches the liquid application position.

When the controller 100 further rotates the movement motor 37 in the first direction, the coil springs 42*a* and 42*b* sandwiched between the upper pressure plate 34 and the base plate 40 are elastically compressed. As a result, the base plate 40 and the liquid application member 44 move down while the upper pressure plate 34 remains at the pressure position. When the base plate 40 is moved down and reaches the first position as illustrated in FIG. 11C, the end of the liquid application member 44 passes through the through hole 34*a* and contacts the sheet P or the sheet bundle Pb. As a result, the binding unit 25 applies liquid to the sheet P or the sheet bundle Pb from the liquid application member 44 at the liquid application position while the sheet P or the sheet bundle Pb is pressed by the upper pressure plate 34 at the pressure position.

In a process in which the base plate 40 moves from the second position to the first position, the position of the upper pressure plate 34 remains unchanged while a pressing force of the upper pressure plate 34 against the sheet P or the sheet bundle Pb changes. Specifically, the pressing force of the upper pressure plate 34 is greater when the base plate 40 is at the first position than when the base plate 40 is at the second position. In other words, the movement mechanism 35 changes the pressing force of the upper pressure plate 34 against the sheet P or the sheet bundle Pb supported on the internal tray 22.

Next, when the movement motor 37 is rotated in the second direction from the state of FIG. 11C, the base plate 40 moves up from the first position to the third position via the second position. At this time, the liquid application member 44 moves up together with the base plate 40. On the other hand, when the base plate 40 is between the first position and the second position, the upper pressure plate 34 remains at the pressure position due to the biasing forces of the coil springs 42*a* and 42*b*. When the base plate 40 is between the second position and the third position, the upper pressure plate 34 moves up together with the base plate 40.

In short, as illustrated in FIG. 11B, the upper pressure plate 34 presses the sheet P or the sheet bundle Pb before the end of the liquid application member 44 contacts the sheet P or the sheet bundle Pb. Then, as illustrated in FIG. 11C, the upper pressure plate 34 presses the periphery of the end of the liquid application member 44 when the liquid application member 44 applies liquid to the sheet P or the sheet bundle Pb. Such a configuration reliably prevents the sheet P or the sheet bundle Pb from floating even when the sheet P or the sheet bundle Pb is wavy or curved. Accordingly, the liquid is applied accurately.

Further, as illustrated in FIG. 11B, the upper pressure plate 34 keeps pressing the sheet P or the sheet bundle Pb while the end of the liquid application member 44 is apart from the sheet P or the sheet bundle Pb at the intermediate separation position. Then, as illustrated in FIG. 11A, the upper pressure plate 34 moves to the release position to release pressure applied to the sheet P or the sheet bundle Pb when the end of the liquid application member 44 moves to the separation position so as to be completely apart from the sheet P or the sheet bundle Pb. Such a configuration reliably prevents the sheet P or the sheet bundle Pb from sticking to the end of the liquid application member 44 after the liquid application member 44 completes the liquid application. Accordingly, the binding unit 25 can smoothly proceeds to the next crimp binding process.

Referring back to FIG. 9, in step S704, the controller 100 determines whether or not the number of sheets P accommodated in the internal tray 22 has reached the given number of sheets indicated by the binding command. When the controller 100 determines that the number of sheets P accommodated in the internal tray 22 has not reached the given number of sheets (NO in step S704), the controller 100 executes the operations of steps S702 and S703 again. In other words, the controller 100 causes the liquid applier 31 to apply liquid each time the sheet P is conveyed to the internal tray 22 by the conveyance roller pairs 10, 11, 14, and 15. Note that the liquid applier 31 may apply liquid to all or some of the sheets P of the sheet bundle Pb.

By contrast, when the controller 100 determines that the number of sheets P accommodated in the internal tray 22 has reached the given number of sheets (YES in step S704), in step S705, the controller 100 drives the liquid application motor 31*a* to move the liquid applier 31 form the binding position P1 to the liquid-application standby position P3 and drives the crimping motor 32*a* to move the crimper 32 from the binding standby position P2 to the binding position P1, as illustrated in FIG. 10C. At the liquid-application standby position P3, the liquid applier 31 stands by during an operation of the crimper 32. The binding position P1, the binding standby position P2, and the liquid-application standby position P3 are different from each other.

Figure 12:
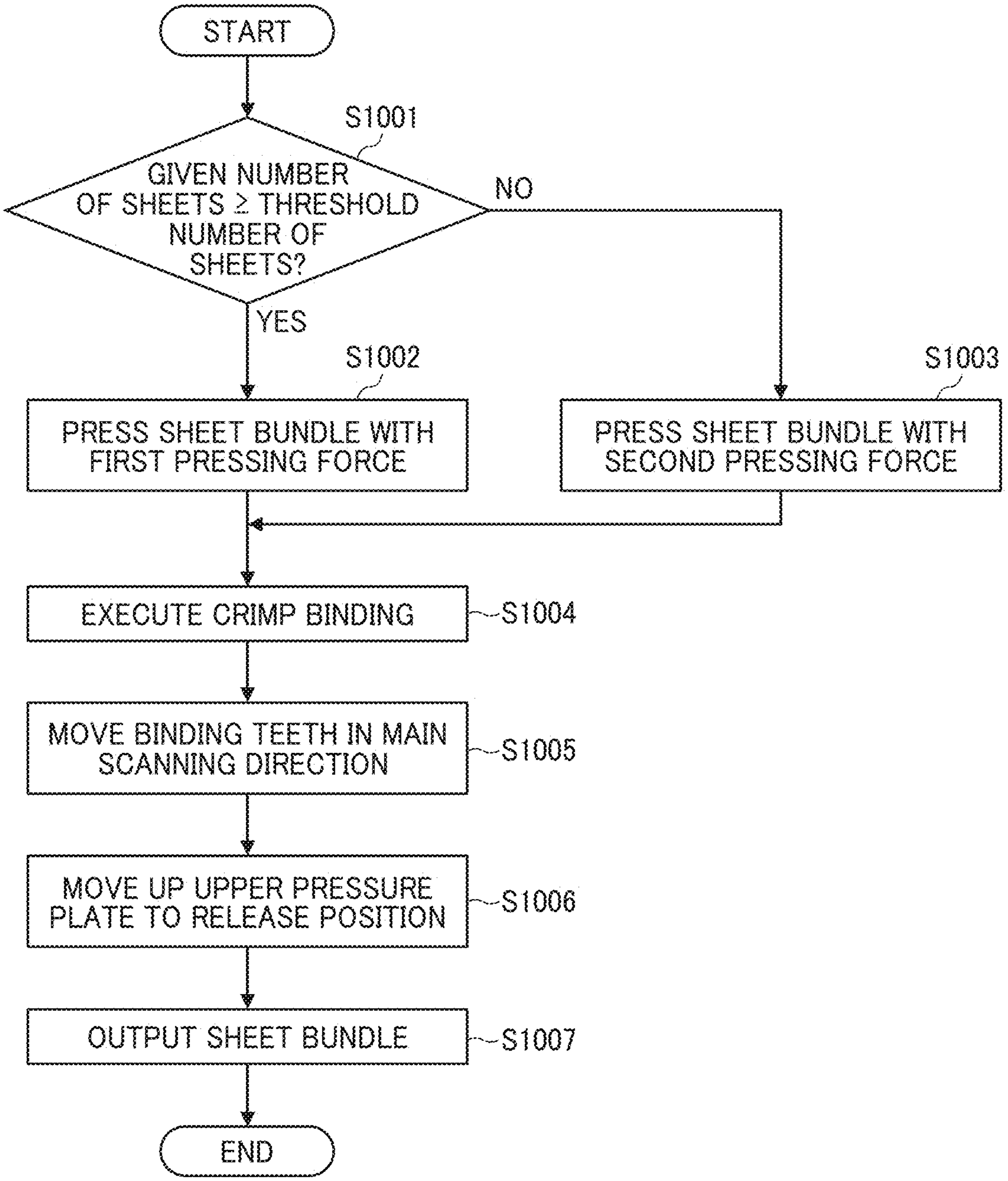
FIG. 12 is a flowchart of a crimp binding process performed by the medium processing apparatus according to the first embodiment of the present disclosure.
Figure 13A:
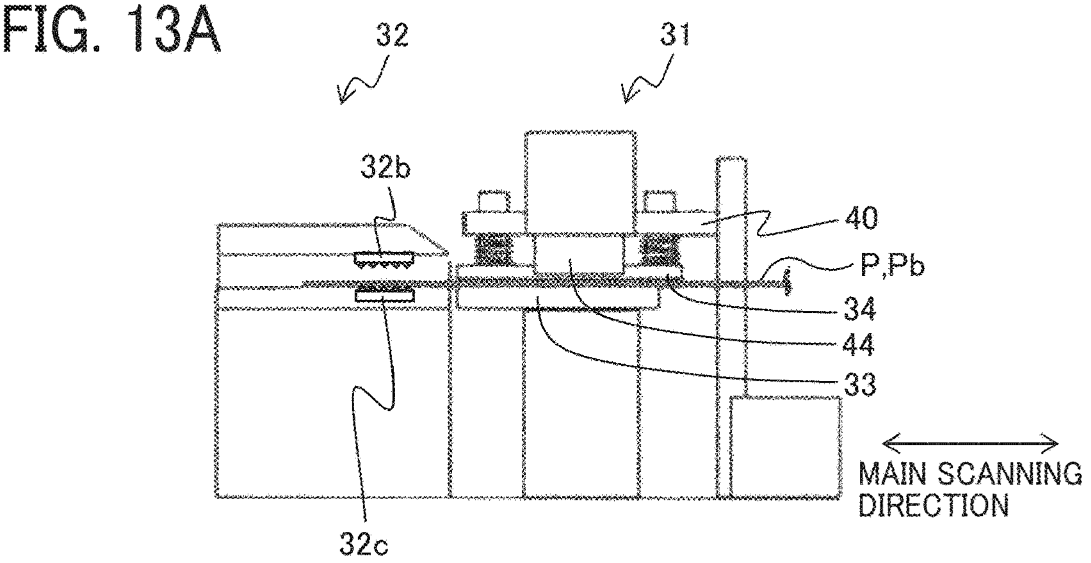
FIGS. 13A to 13C are diagrams illustrating operations of the liquid applier and the crimper in the binding process performed by the medium processing apparatus according to the first embodiment of the present disclosure.
Figure 13B:
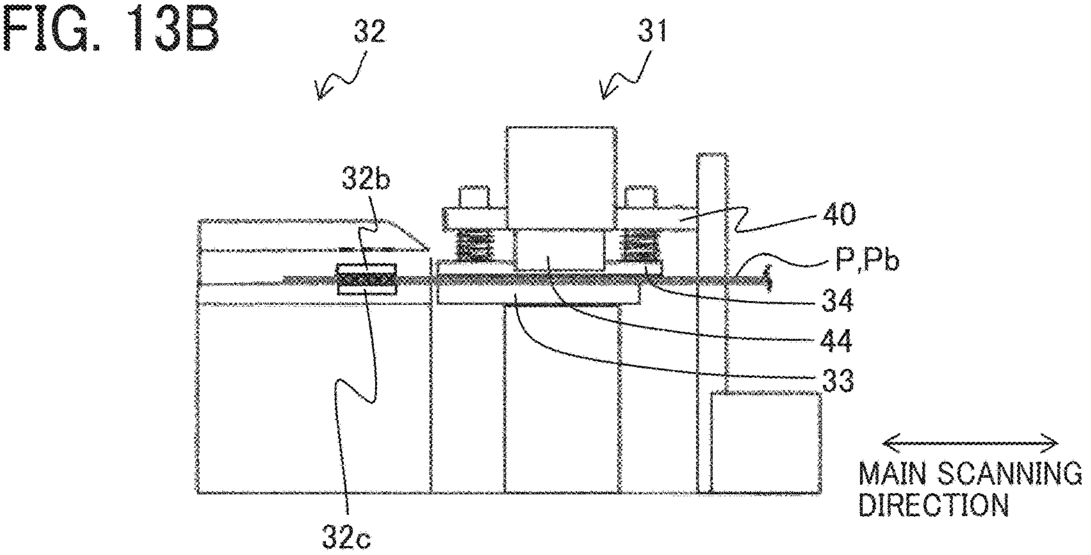
Figure 13C:
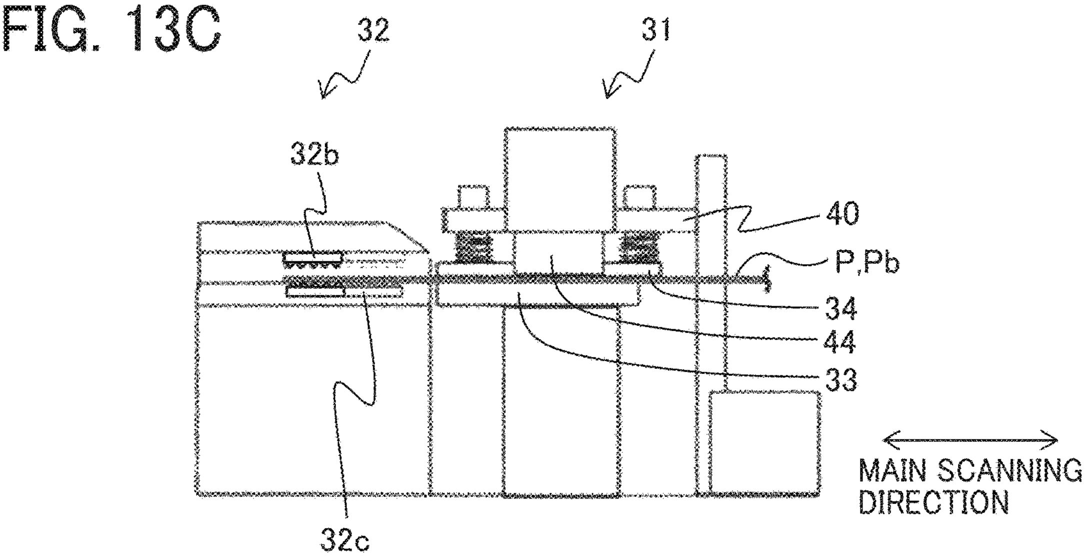

Next, in step S706, the controller 100 executes the crimp binding. The crimp binding is a process to crimp and bind the sheet bundle Pb accommodated in the internal tray 22 and output the sheet bundle Pb to the output tray 26. FIG. 12 is a flowchart of a crimp binding process according to the first embodiment of the present disclosure. FIGS. 13A to 13C are diagrams illustrating operations of the liquid applier 31 and the crimper 32 in the crimp binding process according to the first embodiment of the present disclosure.

First, in step S1001, the controller 100 compares the given number of sheets indicated by the binding command with a predetermined threshold number of sheets. When the given number of sheets is equal to or greater than the threshold number of sheets (YES in step S1001), in step S1002, the controller 100 causes the upper pressure plate 34 to press the sheet bundle Pb with a first pressing force. By contrast, when the given number of sheets is less than the threshold number of sheets (NO in step S1001), in step S1003, the controller 100 causes the upper pressure plate 34 to press the sheet bundle Pb with a second pressing force. Specifically, in steps S1002 and S1003, the controller 100 rotates the movement motor 37 in the first direction to move down the base plate 40 at the third position to a position between the first position and the second position.

In other words, in steps S1002 and S1003, the controller 100 moves down the base plate 40 so that the upper pressure plate 34 is at the pressure position and the end of the liquid application member 44 is above the liquid application position as illustrated in FIG. 13A. In other words, the controller 100 moves down the base plate 40 to a position where the upper pressure plate 34 presses the sheet bundle Pb and where the liquid application member 44 does not apply liquid to the sheet bundle Pb.

At the point in time of step S1002 or S1003, the first member 32*b* and the second member 32*c* are not engaged with each other with the sheet bundle Pb interposed between the first member 32*b* and the second member 32*c* as illustrated in FIG. 13A. In other words, the controller 100 causes the upper pressure plate 34 to press the sheet bundle Pb before causing the crimper 32 to perform the crimp binding. The position of the base plate 40 in the step S1002 is lower than the position of the base plate 40 in the step S1003. In other words, the first pressing force of the upper pressure plate 34 in the step S1002 is greater than the second pressing force of the upper pressure plate 34 in step S1003.

In step S1004, the controller 100 drives the crimper 32 at the binding position P1 to crimp and bind the sheet bundle Pb accommodated in the internal tray 22. Specifically, the controller 100 drives the contact-separation motor 32*d* to engage the binding teeth of the first member 32*b* and the binding teeth of the second member 32*c* with each other, to press and deform the sheet bundle Pb. In other words, as illustrated in FIG. 13B, the controller 100 causes the crimper 32 to execute the crimp binding while the upper pressure plate 34 is at the pressure position.

Next, the controller 100 separates the first member 32*b* and the second member 32*c* from each other while the upper pressure plate 34 is at the pressure position. In step S1005, the controller 100 drives the slide motor 32*e* to cause the first member 32*b* and the second member 32*c* to slide in the main scanning direction as illustrated in FIG. 13C. As a result, the first member 32*b* is peeled off from the sheet bundle Pb that is crimped and bound. For example, when the sheet bundle Pb that is crimped and bound sticks to the first member 32*b*, the first member 32*b* is separated from the sheet bundle Pb and slides while the upper pressure plate 34 keeps pressing the sheet bundle Pb. Thus, the sheet bundle Pb is reliably peeled off from the first member 32*b*. Accordingly, the occurrence of downtime such as interruption of the crimping process is reduced.

Next, in step S1006, the controller 100 rotates the movement motor 37 in the second direction to move up the upper pressure plate 34 to the release position (in other words, to move up the base plate 40 to the third position). In other words, the controller 100 releases the sheet bundle Pb from being pressed by the upper pressure plate 34 after the first member 32*b* is separated from the sheet bundle Pb. In step S1007, the controller 100 rotates the conveyance roller pair 15 to output the sheet bundle Pb crimped and bound to the output tray 26.

Referring back to FIG. 9, in step S707, the controller 100 determines whether or not the number of sheet bundles Pb thus output has reached the requested number of copies indicated by the binding command. When the controller 100 determines that the number of sheet bundles Pb thus output has not reached the requested number of copies (NO in step S707), the controller 100 executes the operations of step S701 and the following steps again. In other words, the controller 100 repeatedly executes the operations of steps S701 to S706 until the number of sheet bundles Pb output to the output tray 26 reaches the requested number of copies (YES in step S707).

When the controller 100 determines that the number of sheet bundles Pb thus output has reached the requested number of copies (YES in step S707), in step S708, the controller 100 drives the liquid application motor 31*a* to move the liquid applier 31 from the liquid-application standby position P3 to the home position HP1 and drives the crimping motor 32*a* to move the crimper 32 from the binding position P1 to the home position HP2. Thus, the controller 100 completes the binding process. As a result, the liquid applier 31 and the crimper 32 return to the positions illustrated in FIG. 10A.

A description is now given of some or all of advantages according to the embodiment described above, enumeration of which is not exhaustive or limiting.

According to the embodiment described above, pressing the sheet P or the sheet bundle Pb with the upper pressure plate 34 reliably prevents floating of the sheet P or the sheet bundle Pb supported on the internal tray 22 even when the sheet P or the sheet bundle Pb is wavy or curved due to an influence of the previous processing. As a result, a stable amount of liquid is applied to the sheet P or the sheet bundle Pb when the end of the liquid application member 44 is brought into contact with the sheet P or the sheet bundle Pb.

In addition, according to the embodiment described above, the end of the liquid application member 44 is brought into contact with and separated from the sheet P or the sheet bundle Pb while the upper pressure plate 34 presses the upper pressure plate 34. Accordingly, the sheet P or the sheet bundle Pb is prevented from floating together with the liquid application member 44 moving up.

In other words, the sheet P or the sheet bundle Pb is prevented from sticking to the liquid application member 44 after the liquid application member 44 completes the liquid application.

As described above, the upper pressure plate 34 has a function of reducing, for example, the curvature of the sheet P or the sheet bundle Pb while the liquid application member 44 applies liquid to the sheet P or the sheet bundle Pb. On the other hand, the upper pressure plate 34 has a function of peeling off the sheet P or the sheet bundle Pb from the liquid application member 44 after the liquid application member 44 completes the liquid application.

Further, according to the embodiment described above, the single movement motor 37 moves the upper pressure plate 34 and the liquid application member 44 while the timing of moving the upper pressure plate 34 differs from the timing of moving the liquid application member 44 due to the biasing forces of the coil springs 42*a* and 42*b*. Accordingly, cost reduction, energy saving, and downsizing are attained. Alternatively, the upper pressure plate 34 and the liquid application member 44 may be moved independently by different movement mechanisms.

Furthermore, according to the embodiment described above, the crimper 32 crimps and binds the sheet bundle Pb while the upper pressure plate 34 presses the sheet bundle Pb. Specifically, the first member 32*b* and the second member 32*c* are brought into contact with and separated from each other while the sheet bundle Pb is pressed by the upper pressure plate 34. Accordingly, the sheet bundle Pb is prevented from sticking to the first member 32*b* and the second member 32*c*. As at least one of the first member 32*b* and the second member 32*c* slides in the main scanning direction after the crimp binding, the sheet bundle is reliably peeled off from the first member 32*b* and the second member 32*c*.

As the number of sheets P of the sheet bundle Pb increases, the binding teeth of the first member 32*b* and the binding teeth of the second member 32*c* have to deeply bite into the sheet bundle Pb. On the other hand, an excessive pressing force of the upper pressure plate 34 may damage the sheet bundle Pb. To address such a situation, according to the embodiment described above, the pressing force of the upper pressure plate 34 against the sheet bundle Pb is changed according to the number of sheets P of the sheet bundle Pb. Accordingly, the sheet bundle Pb is prevented from being damaged and from sticking to the liquid application member 44, the first member 32*b*, and the second member 32*c*.

Note that the parameter for changing the pressing force is not limited to the number of sheets P of the sheet bundle Pb. Alternatively, the controller 100 may change the pressing force of the upper pressure plate 34 against the sheet P or the sheet bundle Pb according to the type of sheets P of the sheet bundle Pb such as plain paper, thick paper, or glossy paper. Alternatively, the controller 100 may change the pressing force of the upper pressure plate 34 against the sheet P or the sheet bundle Pb according to the thickness of sheets P of the sheet bundle Pb. Alternatively, the controller 100 may adjust the pressing force according to a combination of the parameters (the number, type, and thickness of sheets P) described above.

Figure 14A:
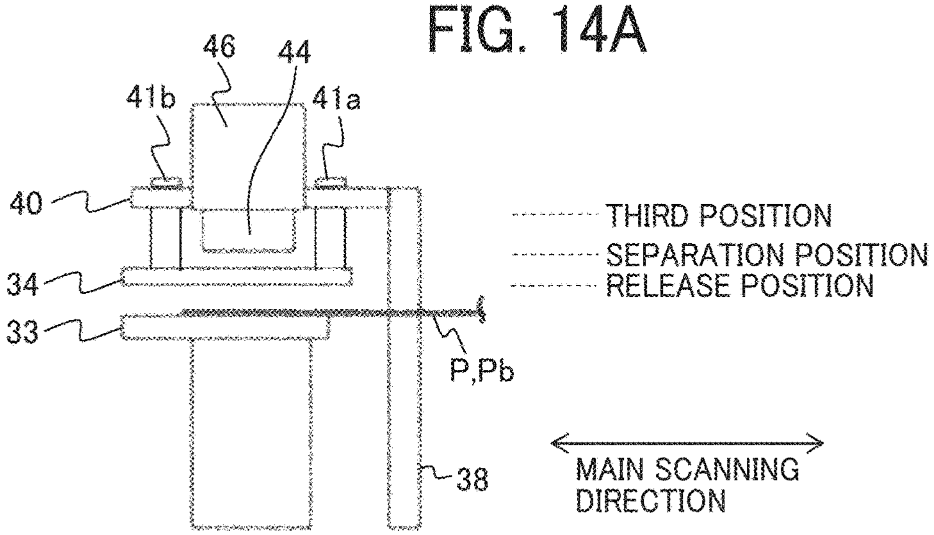
FIGS. 14A to 14C are diagrams illustrating a configuration and an operation of a liquid applier of a medium processing apparatus according to a first modification of the first embodiment of the present disclosure.
Figure 14B:
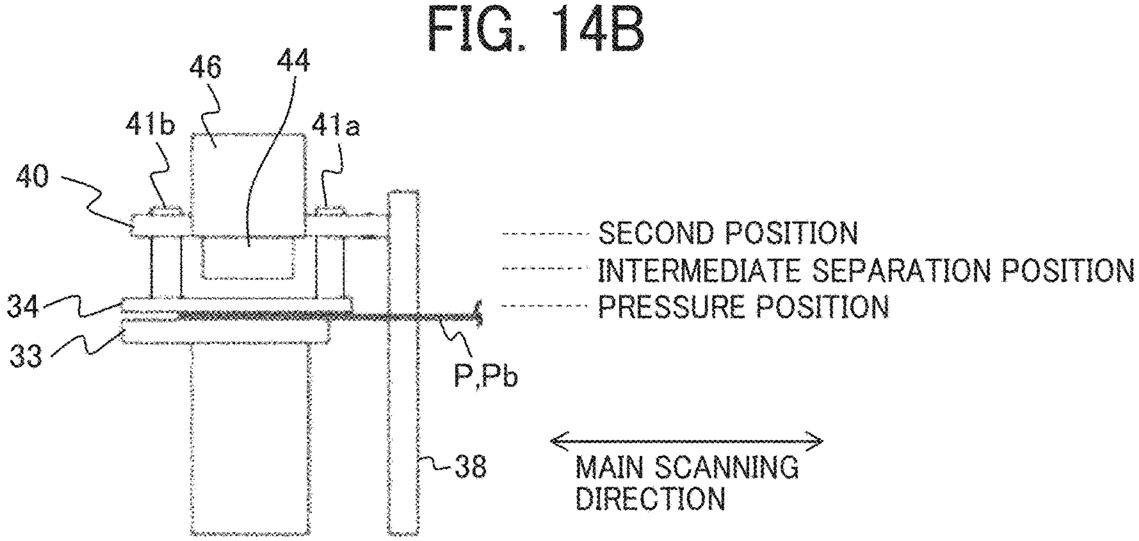
Figure 14C:
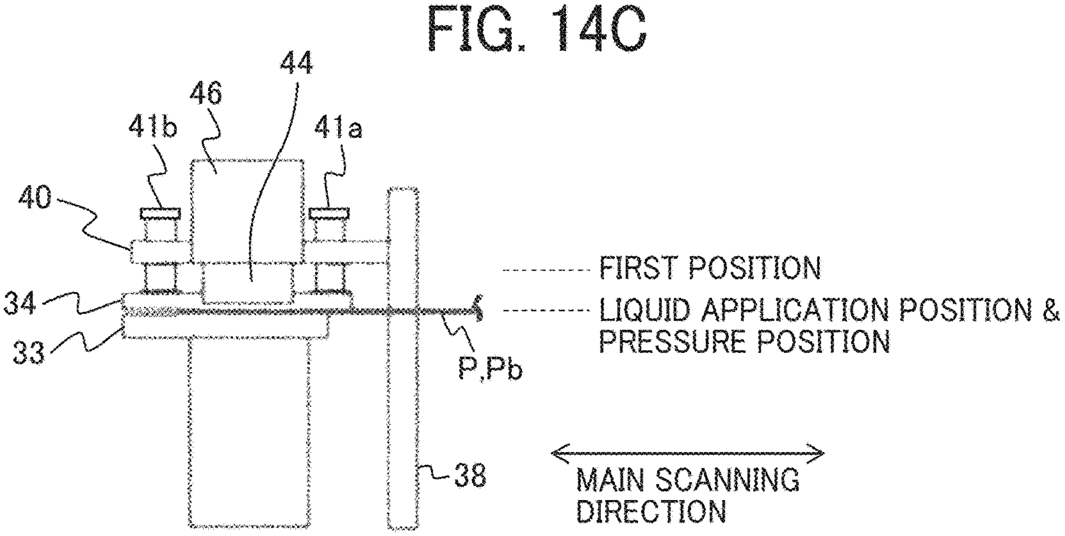

Now, a description is given of a first modification of the embodiment described above. The movement mechanism for the upper pressure plate 34 to press the sheet bundle Pb is not limited to the movement mechanism employing a spring system. Referring now to FIGS. 14A to 14C, a description is given of a modified movement mechanism for the upper pressure plate 34.

FIGS. 14A to 14C illustrate the upper pressure plate 34 of the liquid applier 31 according to the first modification of the present disclosure. The first modification is different from the embodiment described above in that the upper pressure plate 34 is moved by its own weight without using the coil springs 42*a* and 42*b*. As described above with reference to FIGS. 11A to 11C, the upper pressure plate 34 moves between the pressure position illustrated FIGS. 14B and 14C and the release position illustrated in FIG. 14A whereas the liquid application member 44 moves between the liquid application position illustrated in FIG. 14C and the separation position illustrated in FIG. 14A via the intermediate separation position illustrated in FIG. 14B.

The columnar members 41*a* and 41*b* that hold the upper pressure plate 34 penetrate the base plate 40. The movement of the upper pressure plate 34 in the gravity direction is restrained by the stoppers disposed at the respective upper ends of the columnar members 41*a* and 41*b*. In other words, the upper pressure plate 34 is suspended from and held by the base plate 40 via the columnar members 41*a* and 41*b*. Thus, the upper pressure plate 34 is set such that the pressing force acts downward due to gravity. In short, instead of obtaining the pressing force with the coil springs 42*a* and 42*b*, the material and volume of the upper pressure plate 34 are devised to obtain a weight at which an appropriate pressing force can be obtained. Since a support mechanism for the liquid application member 44 is thus simplified, the cost reduction is achieved while the maintainability is enhanced.

Figure 15:
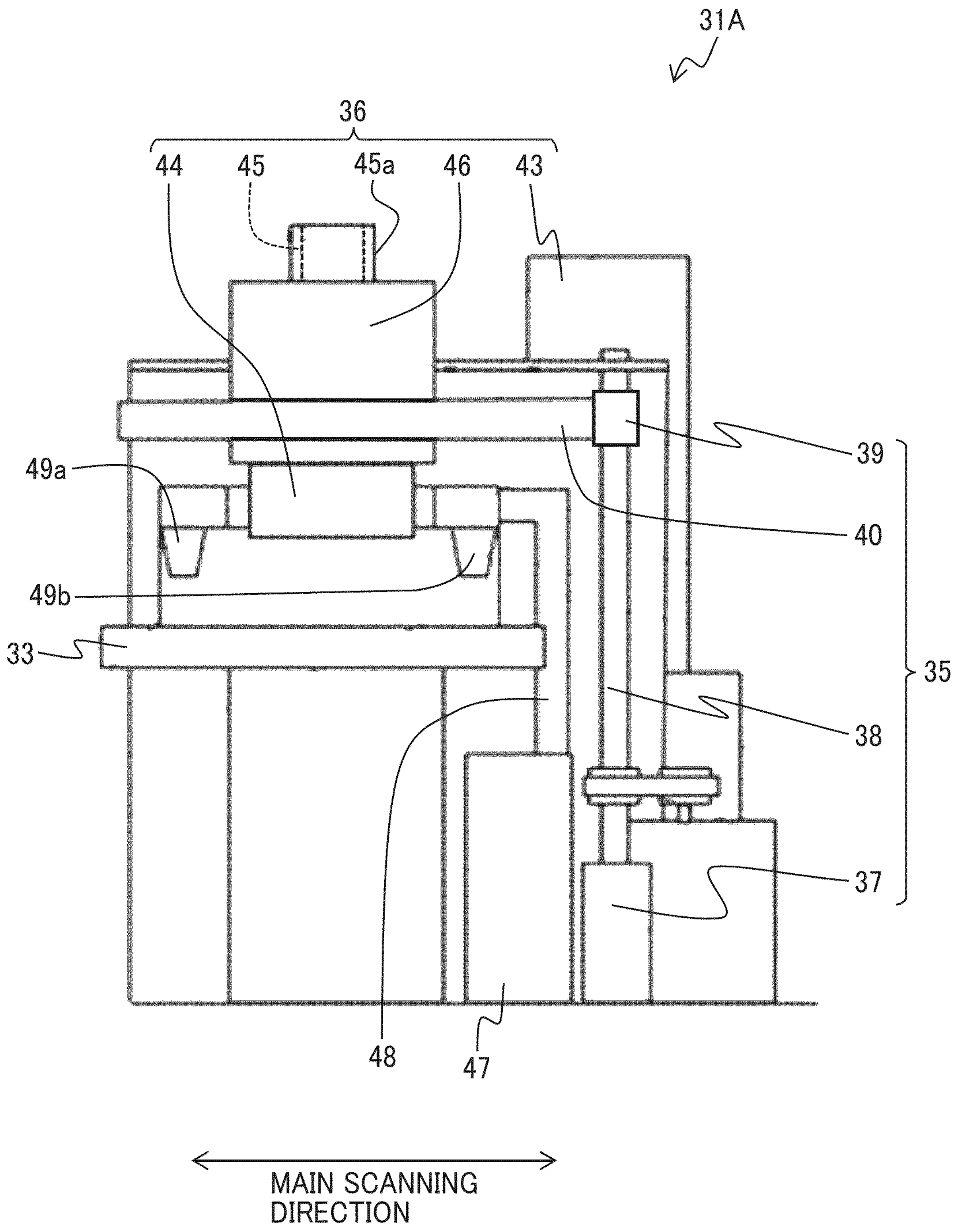
FIG. 15 is a schematic view of an upstream side of a liquid applier of a medium processing apparatus in the conveyance direction, according to a second modification of the first embodiment of the present disclosure.
Figure 16:
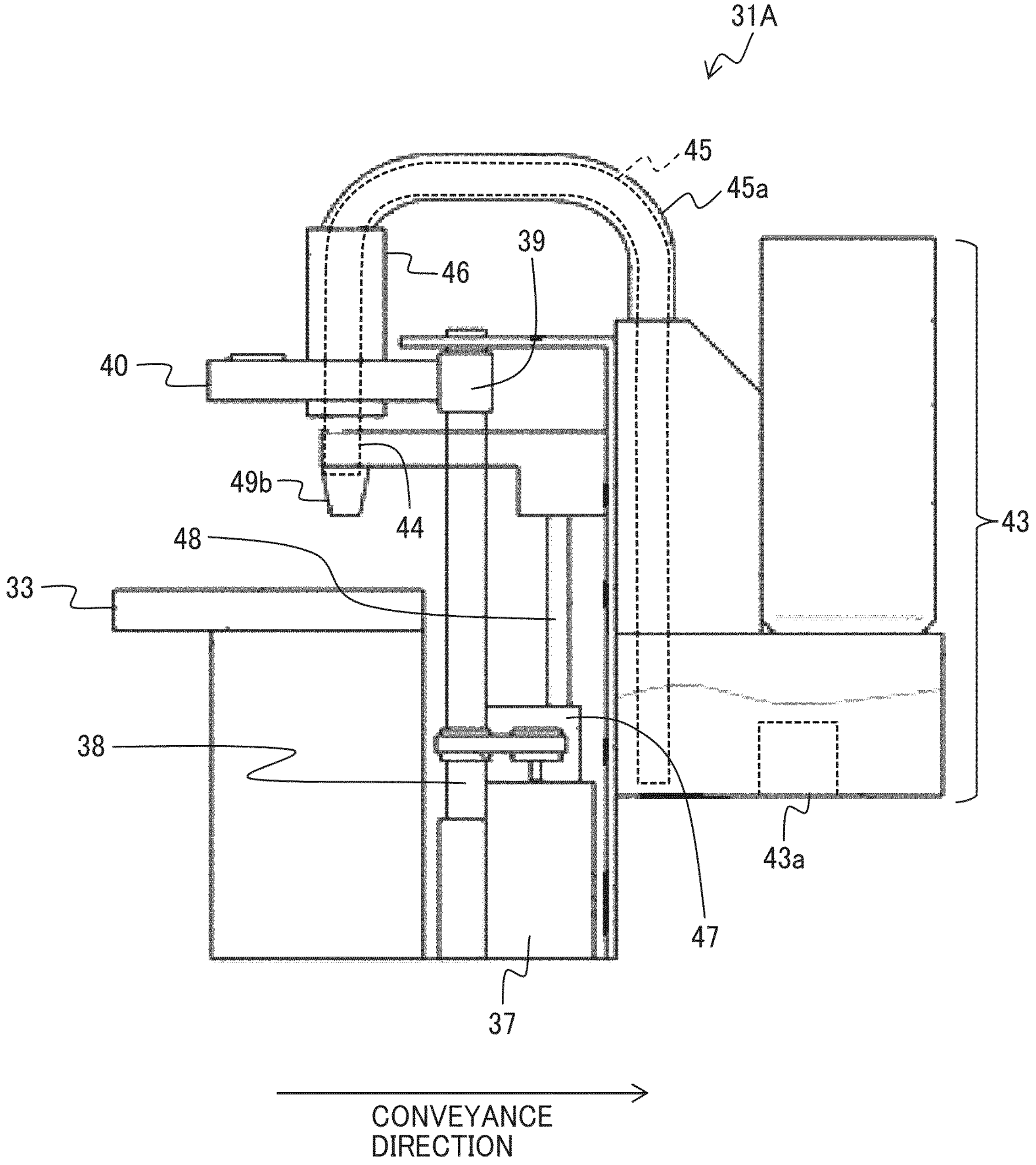
FIG. 16 is a schematic view of the liquid applier of the medium processing apparatus in the main scanning direction, according to the second modification of the first embodiment of the present disclosure.

Now, a description is given of a second modification of the embodiment described above. The presser that presses the sheet bundle Pb is not limited to the upper pressure plate 34. Referring now to FIGS. 15 and 16, a description is given of a modified presser. FIG. 15 is a schematic view of an upstream side of a liquid applier 31A in the conveyance direction, according to the second modification of the embodiment described above. FIG. 16 is a schematic view of the liquid applier 31A in the main scanning direction, according to the second modification of the embodiment described above. Note that detailed descriptions will be omitted of common features of the embodiment described above and the modifications described below. The following description concentrates on the differences between the embodiment described above and the modifications described below.

The liquid applier 31A according to the second modification is different from the liquid applier 31 according to the embodiment described above in that the liquid applier 31A includes a presser that includes a fan 47, an air tube 48, and air nozzles 49*a* and 49*b* while omitting the upper pressure plate 34, the columnar members 41*a* and 41*b*, and the coil springs 42*a* and 42*b*. On the other hand, the liquid appliers 31 and 31A are common in other respects.

The fan 47 causes a current of pressing air to blow to the sheet P or the sheet bundle Pb. The air tube 48 is a channel through which the current of pressing air caused by the fan 47 flows to the air nozzles 49*a* and 49*b*. The air nozzles 49*a* and 49*b* are fixed between the lower pressure plate 33 and the base plate 40 so as to face downward. The air nozzles 49*a* and 49*b* are disposed around the liquid application member 44. The presser according to the second modification causes the current of pressing air to blow from the air nozzles 49*a* and 49*b* to the sheet P or the sheet bundle Pb supported on the internal tray 22 to press the sheet P or the sheet bundle Pb. The presser according to the second modification increases or decreases the volume of the current of pressing air (in other words, the number of rotations of the fan 47) to change the pressing force.

Now, a description is given of a second embodiment of the present disclosure. Specifically, with reference to FIGS. 17 to 21, a description is now given of a post-processing apparatus 3A serving as a medium processing apparatus according to the second embodiment of the present disclosure. In the following description, components like those of the first embodiment are denoted by like reference numerals, and redundant descriptions thereof may be omitted. The post-processing apparatus 3A according to the second embodiment is different from the post-processing apparatus 3 according to the first embodiment in which the liquid applier 31 and the crimper 32 are arranged side by side. In the post-processing apparatus 3A according to the second embodiment, a liquid applier 131 is disposed alone at an upstream position on the conveyance passage in the conveyance direction. Such a configuration allows a given number of sheets P to be stacked after the liquid is applied and conveyed to the crimper 32 that is disposed at a downstream position on the conveyance passage in the conveyance direction. Accordingly, the productivity of the binding process performed by the crimper 32 is enhanced.

Figure 17:
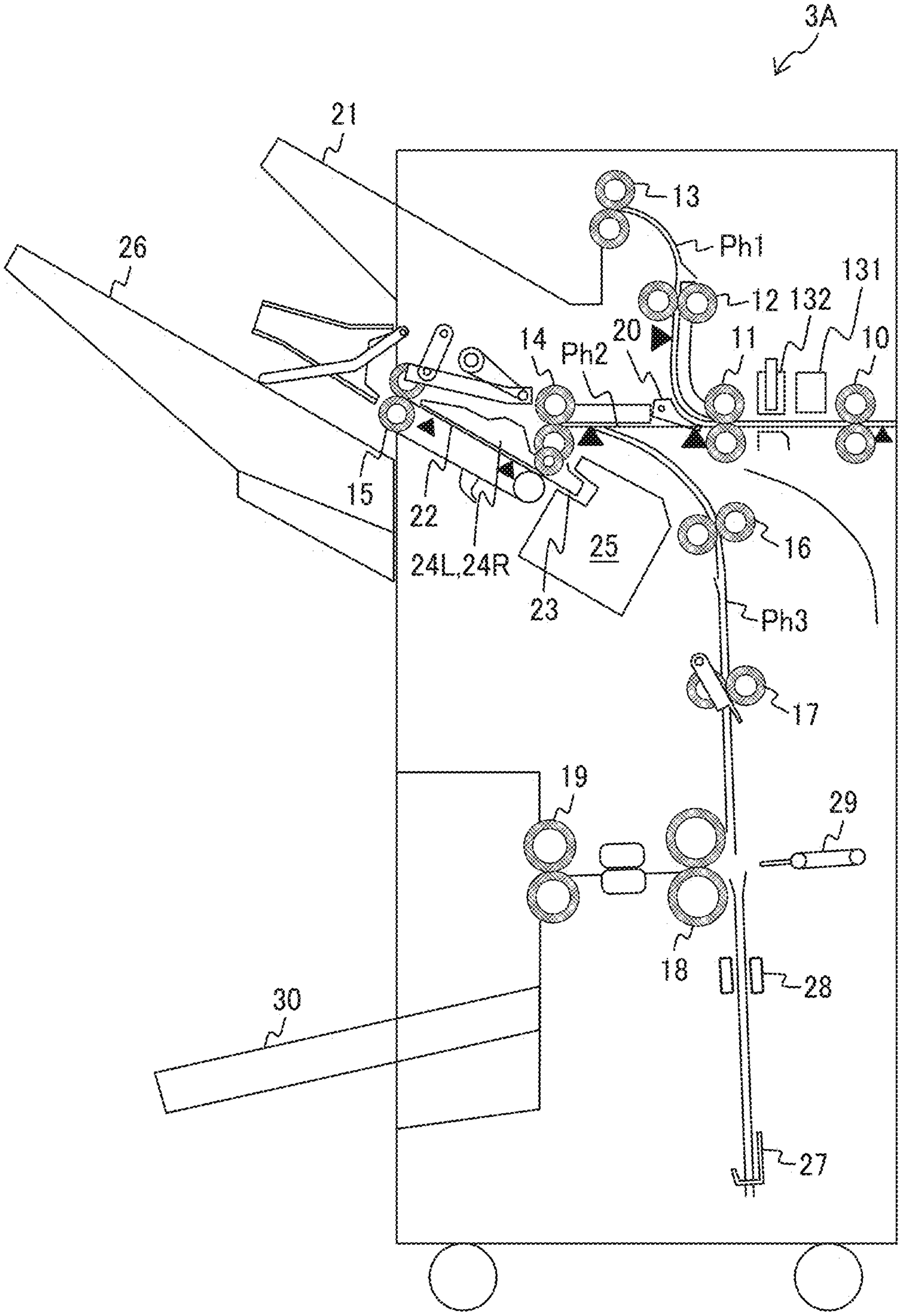
FIG. 17 is a diagram illustrating an internal configuration of a medium processing apparatus according to a second embodiment of the present disclosure.

FIG. 17 is a diagram illustrating an internal configuration of the post-processing apparatus 3A according to the second embodiment of the present disclosure. As illustrated in FIG. 17, the post-processing apparatus 3A further includes the liquid applier 131 and a punch-hole forming unit 132 (processing unit). The liquid applier 131 and the punch-hole forming unit 132 are disposed upstream from the internal tray 22 in the conveyance direction. In addition, the liquid applier 131 and the punch-hole forming unit 132 are disposed at different positions in the conveyance direction to simultaneously face one sheet P conveyed by the conveyance roller pairs 10 to 19. The liquid applier 131 and the punch-hole forming unit 132 according to the present embodiment are disposed between the conveyance roller pairs 10 and 11. However, the arrangement of the liquid applier 131 and the punch-hole forming unit 132 is not limited to the example illustrated in FIG. 17.

The liquid applier 131 applies liquid (for example, water) to the sheet P conveyed by the conveyance roller pairs 10 and 11. In the following description, the application of liquid may be referred to as "liquid application." The punch-hole forming unit 132 forms punch holes in the sheet P conveyed by the conveyance roller pairs 10 and 11 such that the punch holes penetrate the sheet P in the thickness direction of the sheet P. The processing unit disposed near the liquid applier 131 is not limited to the punch-hole forming unit 132. Alternatively, the processing unit may be an inclination correction unit that corrects an inclination (skew) of the sheet P conveyed by the conveyance roller pairs 10 and 11.

Figure 18A:
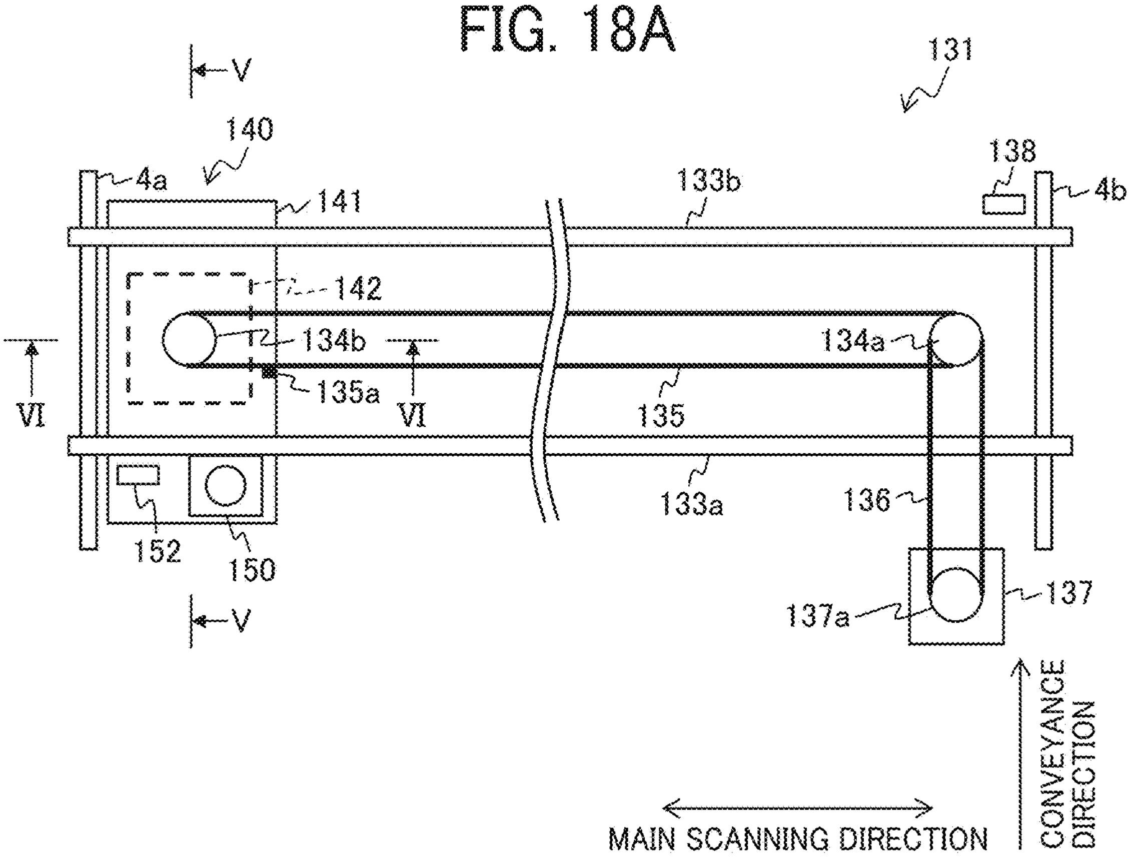
FIGS. 18A and 18B are views of a liquid applier in a thickness direction of a sheet, according to the second embodiment of the present disclosure.
Figure 18B:
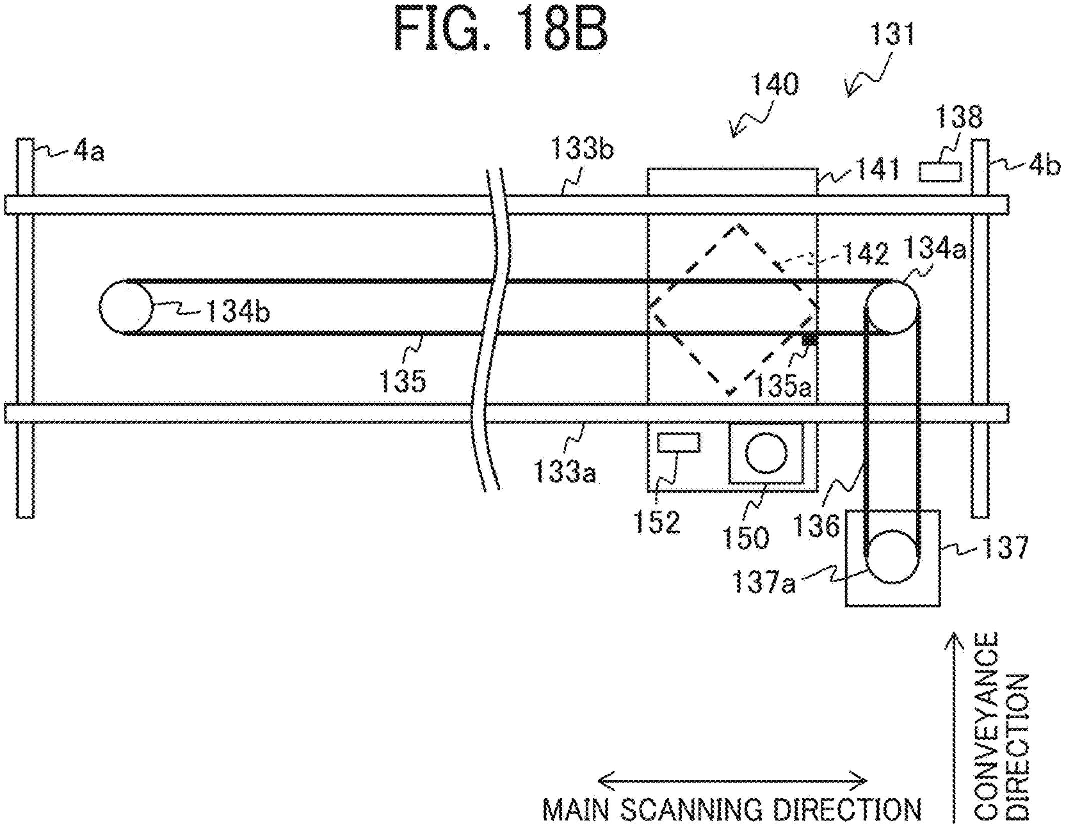
Figure 19C:
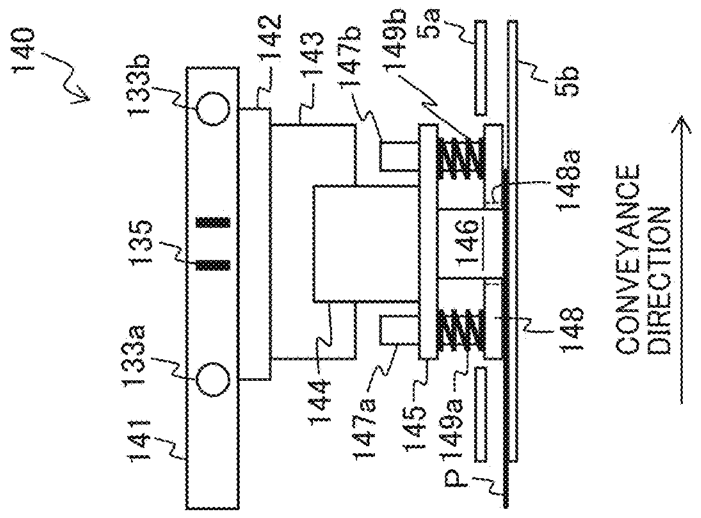
FIGS. 19A to 19C are cross-sectional views of a liquid application unit of the liquid applier taken through V-V of FIG. 18A.
Figure 19B:
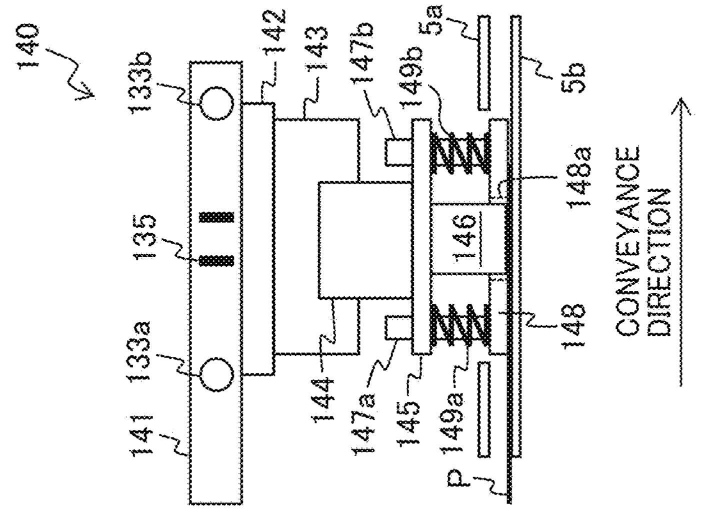
Figure 19A:
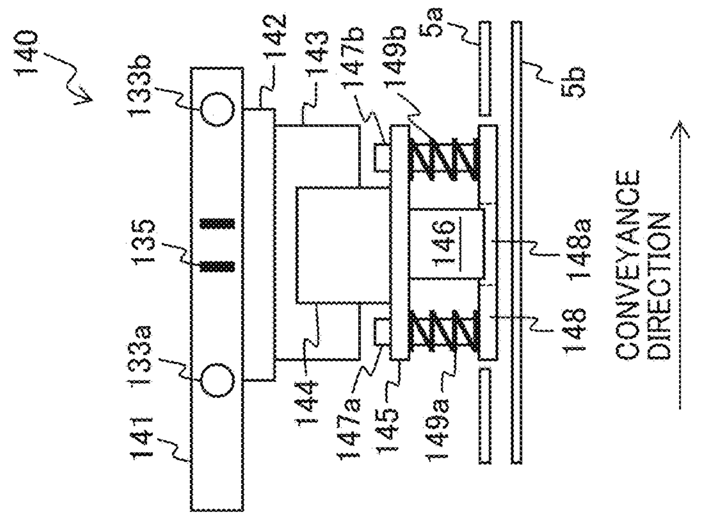
Figure 20A:
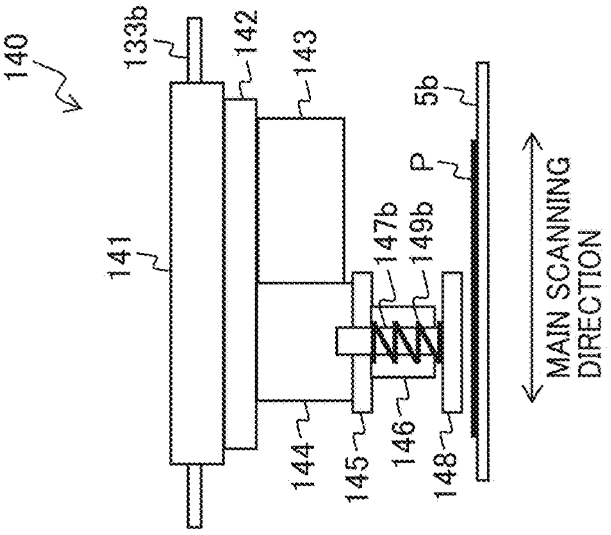
FIGS. 20A to 20C are cross-sectional views of the liquid application unit taken through VI-VI of FIG. 18A.
Figure 20B:
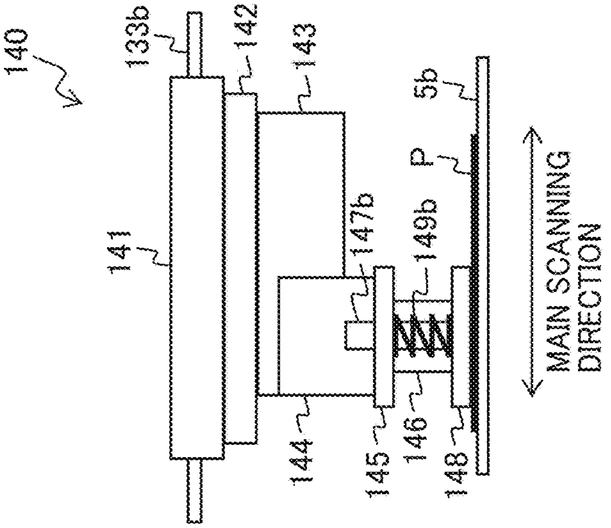
Figure 20C:
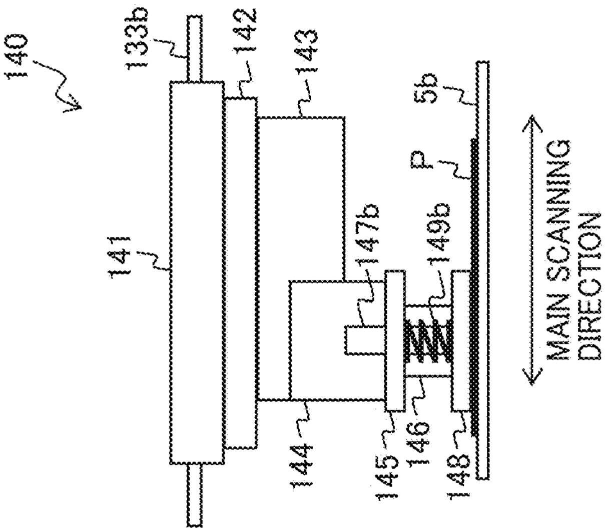

FIGS. 18A and 18B are views of the liquid applier 131 in the thickness direction of the sheet P, according to the second embodiment of the present disclosure. FIGS. 19A to 19C are cross-sectional views of a liquid application unit 140 of the liquid applier 131 taken through V-V of FIG. 18A. FIGS. 20A to 20C are cross-sectional views of the liquid application unit 140 taken through VI-VI of FIG. 18A. As illustrated in FIGS. 18A to 20C, the liquid applier 131 includes a pair of guide shafts 133*a* and 133*b*, a pair of pulleys 134*a* and 134*b*, endless annular belts 135 and 136, a slide motor 137, a home position sensor 138, and a liquid application unit 140.

The guide shafts 133*a* and 133*b*, each extending in the main scanning direction, are apart from each other in the conveyance direction. The pair of guide shafts 133*a* and 133*b* is supported by a pair of side plates 4*a* and 4*b* of the post-processing apparatus 3A. On the other hand, the pair of guide shafts 133*a* and 133*b* supports the liquid application unit 140 such that the liquid application unit 140 can move in the main scanning direction.

The pair of pulleys 134*a* and 134*b* is disposed between the guide shafts 133*a* and 133*b* in the conveyance direction. On the other hand, the pulleys 134*a* and 134*b* are apart from each other in the main scanning direction. The pair of pulleys 134*a* and 134*b* is supported by a frame of the post-processing apparatus 3A so as to be rotatable about an axis extending in the thickness direction of the sheet P.

The endless annular belt 135 is entrained around the pair of pulleys 134*a* and 134*b*. The endless annular belt 135 is coupled to the liquid application unit 140 by a connection 135*a*. The endless annular belt 136 is entrained around the pulley 134*a* and an output shaft 137*a* of the slide motor 137. The slide motor 137 generates a driving force to move the liquid application unit 140 in the main scanning direction.

As the slide motor 137 rotates, the endless annular belt 136 circulates around the pulley 134*a* and the output shaft 137*a* to rotate the pulley 134*a*. As the pulley 134*a* rotates, the endless annular belt 135 circulates around the pair of pulleys 134*a* and 134*b*. As a result, the liquid application unit 140 moves in the main scanning direction along the pair of guide shafts 133*a* and 133*b*. The liquid application unit 140 reciprocates in the main scanning direction in response to the rotation direction of the slide motor 137 being switched.

The home position sensor 138 detects that the liquid deposition unit 140 has reached a home position in the main scanning direction. The home position sensor 138 then outputs a home position signal indicating the detection result to the controller 100 described below (see FIG. 21). The home position sensor 138 is, for example, an optical sensor including a light emitting unit and a light receiving unit. The liquid application unit 140 at the home position blocks an optical path between the light emitting unit and the light receiving unit. Then, the home position sensor 138 outputs the home position signal in response to the light output from the light emitting unit not being received by the light receiving unit. The specific configuration of the home position sensor 138 is not limited to the aforementioned example.

As illustrated in FIGS. 19A to 19C, the conveyance passage inside the post-processing apparatus 3A is defined by an upper guide plate 5*a* and a lower guide plate 5*b*, which are apart from each other in the thickness direction of the sheet P. The liquid application unit 140 is located to face an opening of the upper guide plate 5*a*. In other words, the liquid application unit 140 faces the conveyance passage through the opening of the upper guide plate 5*a* to face the sheet P conveyed along the conveyance passage.

As illustrated in FIGS. 18A to 20C, the liquid application unit 140 includes a liquid application base 141, a rotary bracket 142, a liquid storage tank 143, a movement member 144, an upper pressure plate 145, a liquid application head 146, columnar members 147*a* and 147*b*, a lower pressure plate 148, coil springs 149*a* and 149*b*, a rotary motor 150, a movement motor 151 (see FIG. 21), and a home angle sensor 152.

The liquid application base 141 is supported by the pair of guide shafts 133*a* and 133*b* so as to be slidable in the main scanning direction. The liquid application base 141 is coupled to the endless annular belt 135 by a connection 135*a*. On the other hand, the liquid application base 141 supports the aforementioned components of the liquid application unit 140, namely, the rotary bracket 142, the liquid storage tank 143, the movement member 144, the upper pressure plate 145, the liquid application head 146, the columnar members 147*a* and 147*b*, the lower pressure plate 148, the coil springs 149*a* and 149*b*, the rotary motor 150, the movement motor 151, and the home angle sensor 152.

The rotary bracket 142 is supported by a lower surface of the liquid application base 141 so as to be rotatable about an axis extending in the thickness direction of the sheet P. The rotary bracket 142 is rotated with respect to the liquid application base 141 by a driving force transmitted from the rotary motor 150. On the other hand, the rotary bracket 142 supports the liquid storage tank 143, the movement member 144, the upper pressure plate 145, the liquid application head 146, the columnar members 147*a* and 147*b*, the lower pressure plate 148, and the coil springs 149*a* and 149*b*.

The home angle sensor 152 detects that the rotary bracket 142 has reached a home angle. The home angle sensor 152 then outputs a home angle signal indicating the detection result to the controller 100. The home angle is, for example, an angle for parallel binding. The home angle sensor 152 is, for example, an optical sensor including a light emitting unit and a light receiving unit. The rotary bracket 142 at the home angle blocks an optical path between the light emitting unit and the light receiving unit. Then, the home angle sensor 152 outputs the home angle signal in response to the light output from the light emitting unit not being received by the light receiving unit. The specific configuration of the home angle sensor 152 is not limited to the aforementioned example. Note that FIG. 18A illustrates the rotary bracket 142 in a position for the parallel binding that is performed by the crimper 32 disposed downstream from the liquid applier 131. FIG. 18B illustrates the rotary bracket 142 in a position for diagonal binding (corner binding) that is performed by the crimper 32 disposed downstream from the liquid applier 131.

The liquid storage tank 143 stores liquid to be applied to the sheet P. The movement member 144 is supported by the liquid storage tank 143 so as to be movable in the thickness direction of the sheet P. The movement member 144 is moved with respect to the liquid storage tank 143 by a driving force transmitted from the movement motor 151. The upper pressure plate 145 is attached to a lower end of the movement member 144. The liquid application head 146 projects from the upper pressure plate 145 toward the conveyance passage (downward in the present embodiment). The liquid stored in the liquid storage tank 143 is supplied to the liquid application head 146. The liquid application head 146 is made of a material having a relatively high liquid absorption (for example, sponge or fiber).

The columnar members 147*a* and 147*b* project downward from the upper pressure plate 145 around the liquid application head 146. The columnar members 147*a* and 147*b* can move relative to the upper pressure plate 145 in the thickness direction. The columnar members 147*a* and 147*b* have respective lower ends supporting or holding the lower pressure plate 148. The lower pressure plate 148 has a through hole 148*a* at a position where the through hole 148*a* faces the liquid application head 146. The coil springs 149*a* and 149*b* are fitted around the columnar members 147*a* and 147*b*, respectively, between the upper pressure plate 145 and the lower pressure plate 148. The coil springs 149*a* and 149*b* bias the columnar members 147*a* and 147*b* and the lower pressure plate 148 downward with respect to the upper pressure plate 145.

As illustrated in FIGS. 19A and 20A, before the sheet P is conveyed to the position where the sheets P faces the opening of the upper guide plate 5*a*, the lower pressure plate 148 is positioned at or above the opening. Next, when the sheet P conveyed by the conveyance roller pairs 10 and 11 stops at a position where the liquid application position of the sheet P faces the opening, the movement motor 151 is rotated in the first direction. As a result, the movement member 144, the upper pressure plate 145, the liquid application head 146, the columnar members 147*a* and 147*b*, the lower pressure plate 148, and the coil springs 149*a* and 149*b* are moved down together to allow the lower pressure plate 148 to contact the sheet P. Note that the liquid application position corresponds to a binding position of the sheet P to be crimped and bound by the binding unit 25.

As the movement motor 151 keeps rotating in the first direction after the lower pressure plate 148 contacts the sheet P, the coil springs 149*a* and 149*b* are compressed to further move down the movement member 144, the upper pressure plate 145, the liquid application head 146, and the columnar members 147*a* and 147*b*. As a result, as illustrated in FIGS. 19B and 20B, a lower face of the liquid application head 146 contacts the sheet P through the through hole 148*a*. Then, the liquid contained in the liquid application head 146 is supplied to the sheet P.

Further rotation of the movement motor 151 in the first direction further strongly presses the liquid application head 146 against the sheet P as illustrated in FIGS. 19C and 20C. Accordingly, the amount of liquid applied to the sheet P increases. In short, the liquid applier 131 changes the pressing force of the liquid application head 146 against the sheet P to adjust the amount of liquid applied to the sheet P.

On the other hand, the rotation of the movement motor 151 in the second direction opposite to the first direction moves up the movement member 144, the upper pressure plate 145, the liquid application head 146, the columnar members 147*a* and 147*b*, the lower pressure plate 148, and the coil springs 149*a* and 149*b* together. As a result, as illustrated in FIGS. 19A and 20A, the liquid application head 146 and the lower pressure plate 148 are separated from the sheet P. In other words, the liquid applier 131 includes the liquid application head 146 that can be separated from the sheet P.

Figure 21:
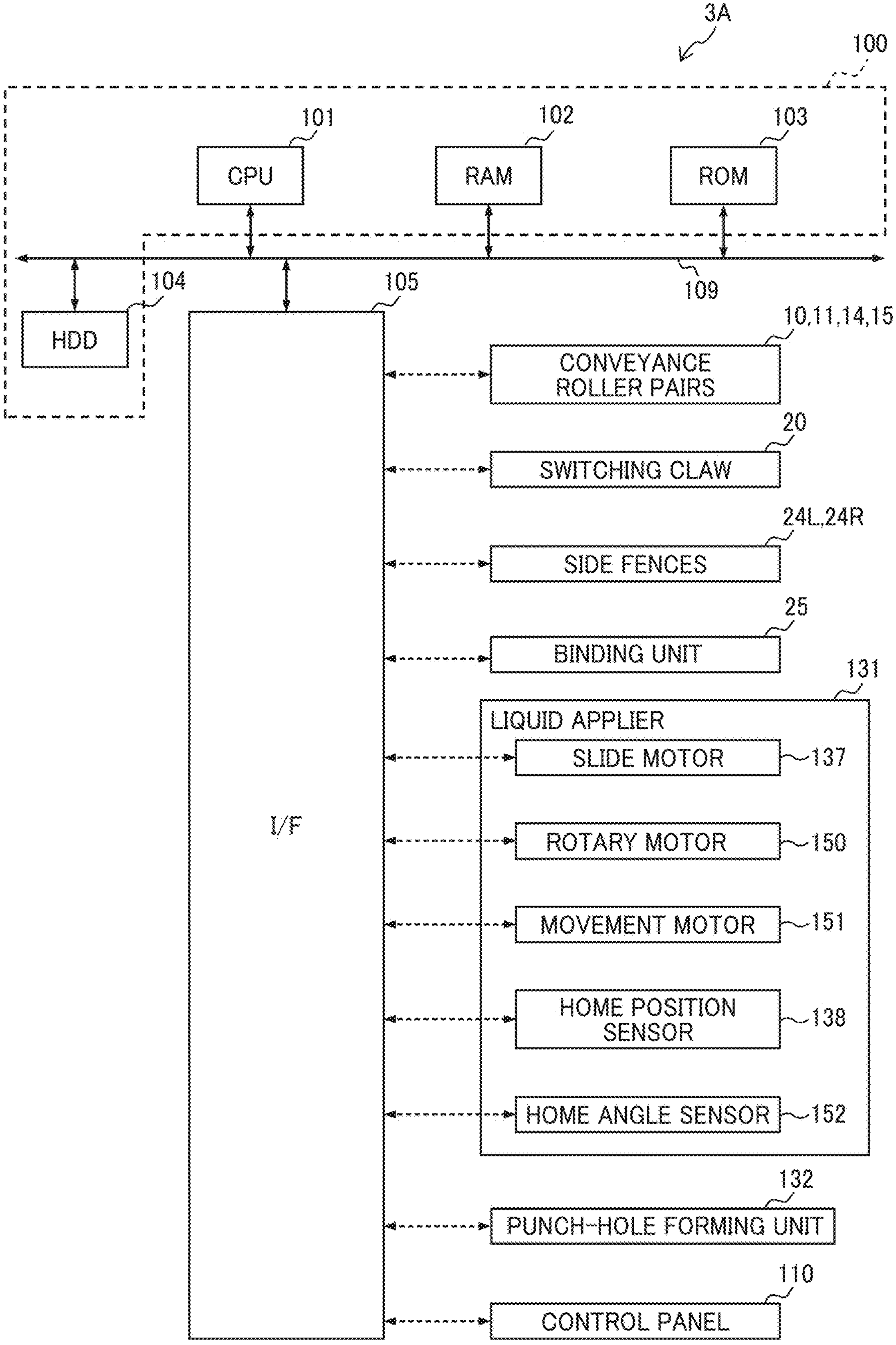
FIG. 21 is a diagram illustrating a hardware configuration of the medium processing apparatus according to the second embodiment of the present disclosure.

FIG. 21 is a block diagram illustrating a hardware configuration of the post-processing apparatus 3A to control the operation of the post-processing apparatus 3A according to the second embodiment of the present disclosure. As illustrated in FIG. 21, the post-processing apparatus 3A includes the CPU 101, the RAM 102, the ROM 103, the HDD 104, and the I/F 105. The CPU 101, the RAM 102, the ROM 103, the HDD 104, and the I/F 105 are connected to each other via the common bus 109.

The CPU 101 is an arithmetic unit and controls the overall operation of the post-processing apparatus 3A. The RAM 102 is a volatile storage medium that allows data to be read and written at high speed. The CPU 101 uses the RAM 102 as a work area for data processing. The ROM 103 is a read-only non-volatile storage medium that stores programs such as firmware. The HDD 104 is a non-volatile storage medium that allows data to be read and written and has a relatively large storage capacity. The HDD 104 stores, for example, an OS, various control programs, and application programs.

By an arithmetic function of the CPU 101, the post-processing apparatus 3A processes, for example, a control program stored in the ROM 103 and an information processing program (application program) loaded into the RAM 102 from a storage medium such as the HDD 104. Such processing configures a software controller including various functional modules of the post-processing apparatus 3A. The software controller thus configured cooperates with hardware resources of the post-processing apparatus 3A to construct functional blocks that implement functions of the post-processing apparatus 3A. In other words, the CPU 101, the RAM 102, the ROM 103, and the HDD 104 construct the controller 100 that controls the operation of the post-processing apparatus 3A.

The I/F 105 is an interface that connects the conveyance roller pairs 10, 11, 14, and 15, the switching claw 20, the side fences 24L and 24R, the binding unit 25, the liquid applier

131, the punch-hole forming unit 132, and the control panel 110 to the common bus 109. The controller 100 controls, via the I/F 105, the operations of the conveyance roller pairs 10, 11, 14, and 15, the switching claw 20, the side fences 24L and 24R, the binding unit 25, the liquid applier 131, and the punch-hole forming unit 132. Although FIG. 21 illustrates the components that execute the edge stitching, the components that execute the saddle stitching are controlled by the controller 100 like the components that execute the edge stitching.

The control method described above may be implemented by, for example, a program. In other words, the control method is executed by a computer that causes an arithmetic device, a storage device, an input device, an output device, and a control device to operate in cooperation with each other based on a program. The program may be written in, for example, a storage device or a storage medium and distributed. Alternatively, the program may be distributed through, for example an electric communication line.

The post-processing apparatuses 3 and 3A according to the embodiments described above enhance the binding strength to bind the plurality of sheets P as the sheet bundle Pb while preventing the sheet P or the sheet bundle Pb from sticking to the liquid applier 31 or 131 in response to the liquid being applied to a portion of the sheet P or the sheet bundle Pb to be bound. In addition, the liquid is stably applied to the sheet P or the sheet bundle Pb. Accordingly, in a case where the shape at the binding position of the sheets P of the sheet bundle Pb is disturbed, the sheet P or the sheet bundle Pb does not float from the tray when the liquid is applied, rendering a stable amount of liquid being applied to the sheet P or the sheet bundle Pb. As a result, the liquid is stably applied to the crimp binding position on the sheets P, rendering the sheet bundle Pb stably bound.

Now, a description is given of some aspects of the present disclosure.

Initially, a description is given of a first aspect.

A medium processing apparatus includes a conveying unit, a liquid applier, and a crimper.

The conveying unit conveys a medium in a conveyance direction.

The liquid applier applies liquid to the medium, which is at least one medium, conveyed by the conveying unit.

The crimper presses and deforms a plurality of media including the medium to which the liquid is applied by the liquid applier, to crimp and bind the plurality of media.

The liquid applier includes a presser and a liquid application member.

The presser presses at least one medium.

The liquid application member can contact and be separated from at least one medium while the presser presses at least one medium.

Now, a description is given of a second aspect.

In the medium processing apparatus according to the first aspect, the liquid applier further includes a movement mechanism that moves the liquid application member.

The movement mechanism moves the liquid application member from a separation position where the liquid application member is apart from at least one medium to a liquid application position where the liquid application member contacts at least one medium.

Now, a description is given of a third aspect.

In the medium processing apparatus according to the first or second aspect, the liquid applier further includes a movement mechanism that moves the liquid application member.

The movement mechanism moves the liquid application member from a liquid application position where the liquid application member contacts at least one medium to a separation position where the liquid application member is apart from at least one medium.

Now, a description is given of a fourth aspect.

In the medium processing apparatus according to the second or third aspect, the movement mechanism includes a single driving source that moves the presser and the liquid application member in conjunction with each other.

Now, a description is given of a fifth aspect.

In the medium processing apparatus according to any one of the first to fourth aspects, the presser is movable between a pressure position where the presser contacts and presses at least one medium and a release position apart from the pressure position.

Now, a description is given of a sixth aspect.

In the medium processing apparatus according to any one of the first to fifth aspects, the presser includes an inclined portion that guides the medium conveyed to the inclined portion.

Now, a description is given of a seventh aspect.

The medium processing apparatus according to any one of the first to sixth aspects, further includes an opposed unit that sandwiches the medium with the presser.

Now, a description is given of an eighth aspect.

In the medium processing apparatus according to the seventh aspect, the opposed unit includes an opposed member that contacts the medium and a holding unit that holds the opposed member.

Now, a description is given of a ninth aspect.

In the medium processing apparatus according to any one of the eighth aspect, the opposed member includes an inclined portion that guides the medium conveyed to the inclined portion.

Now, a description is given of a tenth aspect.

In the medium processing apparatus according to the eighth or ninth aspect, the opposed unit further includes a drainage unit. The opposed member has a contact face that contacts the medium and a through hole communicating with the drainage unit disposed at a side opposite to the contact face of the opposed member.

Now, a description is given of an eleventh aspect.

In the medium processing apparatus according to the tenth aspect, the drainage unit is removably attached to the holding unit, alone or together with the opposed member.

Now, a description is given of a twelfth aspect.

In the medium processing apparatus according to the second or third aspect, the movement mechanism includes a base member, a columnar member, and a biasing member.

The base member is movable together with the liquid application member.

The columnar member projects from the base member and holds the presser. The columnar member is movable relative to the base member in a thickness direction of the plurality of media.

The biasing member is disposed between the presser and the base member to bias the presser with respect to the base member.

The base member is moved by a driving force transmitted from a driving source, from a first position where the presser is at the pressure position and where the liquid application member is at the liquid application position to a third position where the presser is at a release position apart from the pressure position and where the liquid application member is at the separation position via a second position where the presser is at the pressure position and where the liquid application member is apart from the medium.

Now, a description is given of a thirteenth aspect.

In the medium processing apparatus according to any one of the first to twelfth aspects, the crimper crimps and binds the plurality of media while the presser presses the plurality of media.

Now, a description is given of a fourteenth aspect.

The medium processing apparatus according to any one of the first to thirteenth aspects, the presser can change a pressing force against the plurality of media.

Now, a description is given of a fifteenth aspect.

The medium processing apparatus according to any one of the first to fourteenth aspects, the presser changes a pressing force according to at least one of the number, type, and thickness of the medium.

Now, a description is given of a sixteenth aspect.

An image forming system includes an image forming apparatus and the medium processing apparatus according to any one of the first to fifteenth aspects. The image forming apparatus forms an image on the medium.

The medium processing apparatus crimps and binds the plurality of media on each of which the image is formed by the image forming apparatus.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. It is therefore to be understood that the disclosure of this patent specification may be practiced otherwise by those skilled in the art than as specifically described herein and such modifications and alternatives are within the technical scope of the appended claims. Such embodiments and variations thereof are included in the scope and gist of the embodiments of the present disclosure and are included in the embodiments described in claims and the equivalent scope thereof. Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The processing apparatuses include any suitably programmed apparatuses such as a general purpose computer, a personal digital assistant, a Wireless Application Protocol (WAP) or third-generation (3G)-compliant mobile telephone, and so on. Since the present invention can be implemented as software, each and every aspect of the present invention thus encompasses computer software implementable on a programmable device. The computer software can be provided to the programmable device using any conventional carrier medium (carrier means). The carrier medium includes a transient carrier medium such as an electrical, optical, microwave, acoustic or radio frequency signal carrying the computer code. An example of such a transient medium is a Transmission Control Protocol/Internet Protocol (TCP/IP) signal carrying computer code over an IP network, such as the Internet. The carrier medium may also include a storage medium for storing processor readable code such as a floppy disk, a hard disk, a compact disc read-only memory (CD-ROM), a magnetic tape device, or a solid state memory device.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

This patent application is based on and claims priority to Japanese Patent Application Nos. 2021-178096, filed on Oct. 29, 2021, and 2022-142320, filed on Sep. 7, 2022, in the Japan Patent Office, the entire disclosure of each of which is hereby incorporated by reference herein.

REFERENCE SIGNS LIST

1: Image forming system
2: Image forming apparatus
3: Post-processing apparatus
10 to 19: Conveyance roller pairs
20: Switching claw
21: Output tray
22: Internal tray
23: End fence
24L, 24R: Side fences
25, 28: Binding units
26, 30: Output trays
27: End fence
29: Sheet folding blade
31, 31A, 131: Liquid appliers
31*a*: Liquid application motor
32: Crimper
32*a*: Crimping motor
32*b*: First member
32*c*: Second member
32*d*: Contact-separation motor
32*e*, 137: Slide motors
33, 148: Lower pressure plates
34, 145: Upper pressure plates
33*a*, 34*a*, 148*a*: Through holes
35: Movement mechanism
36: Liquid application mechanism
37, 151: Movement motor
38: Trapezoidal screw
39: Nut
40: Base plate
40*a*: Movement sensor
41*a*, 41*b*, 147*a*, 147*b*: Columnar members
42*a*, 42*b*, 149*a*, 149*b*: Coil springs
43, 143: Liquid storage tanks
43*a*: Liquid amount sensor
44: Liquid application member
45: Supply member
45*a*: Protection member
46: Joint
47: Fan
48: Air tube
49*a*, 49*b*: Air nozzles
100: Controller

101: CPU
102: RAM
103: ROM
104: HDD
105: I/F
109: Common bus
110: Control panel
132: Punch-hole forming unit
133*a*, 133*b*: Guide shafts
134*a*, 134*b*: Pulleys
135, 136: Endless annular belts
137*a*: Output shaft
138: Home position sensor
140: Liquid application unit
141: Liquid application base
142: Rotary bracket
144: Movement member
146: Liquid application head
150: Rotary motor
152: Home angle sensor
331: Lower-pressure-plate holder

The invention claimed is:

1. A medium processing apparatus comprising:

a conveying device configured to convey a medium in a conveyance direction;

a liquid applier configured to apply liquid to the medium conveyed by the conveying device, the liquid applier including, a presser configured to press the medium, and a liquid application member configured to contact and be separated from the medium while the presser presses the medium while the medium is at a first location in the conveyance direction; and a crimper configured to press and deform a plurality of media including the medium to which the liquid is applied by the liquid applier, to crimp and bind the plurality of media while the plurality of media are at a second location downstream from the first location in the conveyance direction.

2. A medium processing apparatus, comprising:

a conveying device configured to convey a medium in a conveyance direction;

a liquid applier configured to apply liquid to the medium conveyed by the conveying device, the liquid applier including, a presser configured to press the medium, a liquid application member configured to contact and be separated from the medium while the presser presses the medium, and an opposed device configured to sandwich the medium with the presser, the opposed device including, an opposed member configured to contact the medium, and a holder configured to hold the opposed member; and a crimper configured to press and deform a plurality of media including the medium to which the liquid is applied by the liquid applier, to crimp and bind the plurality of media.

3. The medium processing apparatus according to claim 2, wherein the liquid applier further includes a movement mechanism configured to move the liquid application member; and the movement mechanism is further configured to move the liquid application member from a separation position where the liquid application member is apart from the medium to a liquid application position where the liquid application member contacts the medium.

4. The medium processing apparatus according to claim 3, wherein the movement mechanism includes a single driving source configured to move the presser and the liquid application member in conjunction with each other.

5. The medium processing apparatus according to claim 3, wherein the movement mechanism includes:

a base member movable together with the liquid application member;

a columnar member projecting from the base member and holding the presser, the columnar member being movable relative to the base member in a thickness direction of the plurality of media; and a biasing member between the presser and the base member to bias the presser with respect to the base member, and wherein the base member is configured to be moved by a driving force transmitted from a driving source, from a first position where the presser is at a pressure position where the presser contacts and presses the medium and where the liquid application member is at the liquid application position to a third position where the presser is at a release position apart from the pressure position and where the liquid application member is at the separation position via a second position where the presser is at the pressure position and where the liquid application member is apart from the medium.

6. The medium processing apparatus according to claim 2, wherein the liquid applier further includes a movement mechanism configured to move the liquid application member; and the movement mechanism is further configured to move the liquid application member from a liquid application position where the liquid application member contacts the medium to a separation position where the liquid application member is apart from the medium.

7. The medium processing apparatus according to claim 2, wherein the presser is configured to move between a pressure position where the presser contacts and presses the medium and a release position apart from the pressure position.

8. The medium processing apparatus according to claim 2, wherein the presser includes an inclined portion configured to guide the medium conveyed to the inclined portion.

9. The medium processing apparatus according to claim 2, wherein the opposed member includes an inclined portion configured to guide the medium conveyed to the inclined portion.

10. The medium processing apparatus according to claim 2, wherein the opposed device further includes a drainage device, and the opposed member includes a contact face and a through hole, the contact face configured to contact the medium, and the through hole configured to communicate with the drainage device, the drainage device at a side opposite to the contact face of the opposed member.

11. The medium processing apparatus according to claim 10, wherein the drainage device is configured to be removably attached to the holder.

12. The medium processing apparatus according to claim 10, wherein the drainage device is configured to be removably attached to the holder together with the opposed member.

13. The medium processing apparatus according to claim 2, wherein the crimper is configured to crimp and bind the plurality of media while the presser presses the plurality of media.

14. The medium processing apparatus according to claim 2, wherein the presser is configured to change a pressing force against the plurality of media.

15. The medium processing apparatus according to claim 2, wherein the presser is configured to change a pressing force according to at least one of a number, a type, and thickness of the medium.

16. An image forming system comprising:

an image forming apparatus configured to form an image on a medium; and a medium processing apparatus including, a conveying device configured to convey the medium in a conveyance direction;

a liquid applier configured to apply liquid to the medium conveyed by the conveying device, the liquid applier including, a presser configured to press the medium, a liquid application member configured to contact and be separated from the medium while the presser presses the medium, and an opposed device configured to sandwich the medium with the presser, the opposed device including, an opposed member configured to contact the medium, and a holder configured to hold the opposed member; and a crimper configured to press and deform a plurality of media including the medium to which the liquid is applied by the liquid applier, to crimp and bind the plurality of media.

17. The image forming system according to claim 16, wherein the liquid applier further includes a movement mechanism configured to move the liquid application member; and the movement mechanism is further configured to move the liquid application member from a separation position where the liquid application member is apart from the medium to a liquid application position where the liquid application member contacts the medium.

18. The image forming system according to claim 16, wherein the liquid applier further includes a movement mechanism configured to move the liquid application member; and the movement mechanism is further configured to move the liquid application member from a liquid application position where the liquid application member contacts the medium to a separation position where the liquid application member is apart from the medium.

19. The image forming system according to claim 16, further comprising:

an opposed device configured to sandwich the medium with the presser, the opposed device including, an opposed member configured to contact the medium; and a holder configured to hold the opposed member.

* * * * *